United States Patent [19]
Saitoh et al.

[11] Patent Number: 5,598,390
[45] Date of Patent: Jan. 28, 1997

[54] DUAL MORE RECORDING AND REPRODUCING APPARATUS HAVING TWO RECORDING REGIONS USING DIFFERING REPRODUCTION PRINCIPLES

[75] Inventors: Hiroshi Saitoh, Saitama; Hideki Takahashi, Kanagawa, both of Japan

[73] Assignee: Sony Corporation, Tokyo, Japan

[21] Appl. No.: 643,228

[22] Filed: May 2, 1996

Related U.S. Application Data

[60] Continuation of Ser. No. 449,264, May 24, 1995, abandoned, which is a division of Ser. No. 255,467, Jun. 8, 1994.

[30] Foreign Application Priority Data

Jun. 14, 1993 [JP] Japan .................................... 5-165953
Jun. 14, 1993 [JP] Japan .................................... 5-165954

[51] Int. Cl.⁶ ....................................................... G11B 7/00
[52] U.S. Cl. ...................................... 369/50; 369/58
[58] Field of Search ................................ 369/47, 48, 50, 369/54, 58; 360/71, 72.1, 72.2, 73.01, 73.03

[56] References Cited

U.S. PATENT DOCUMENTS

| | | | |
|---|---|---|---|
| 4,761,692 | 8/1988 | Yoshida et al. .......................... | 358/335 |
| 4,885,644 | 12/1989 | Ishii et al. .................................. | 369/50 |
| 5,010,539 | 4/1991 | Terashima et al. ....................... | 369/50 |
| 5,136,560 | 8/1992 | Hangai et al. ............................. | 369/54 |
| 5,138,598 | 8/1992 | Sako et al. ................................. | 369/47 |
| 5,199,022 | 3/1993 | Suzuki et al. .......................... | 369/275.1 |
| 5,202,874 | 4/1993 | Zucker et al. ............................. | 369/54 |
| 5,251,196 | 10/1993 | Morimoto et al. ....................... | 369/110 |
| 5,289,450 | 2/1994 | Mizumoto et al. ....................... | 369/54 |
| 5,289,451 | 2/1994 | Ashinuma et al. ....................... | 369/58 |
| 5,313,443 | 5/1994 | Iitsuka ...................................... | 369/50 |

FOREIGN PATENT DOCUMENTS

| | | | |
|---|---|---|---|
| 0278006A1 | 8/1988 | European Pat. Off. ........ | G11B 20/12 |
| 0485234A3 | 5/1992 | European Pat. Off. ........ | G11B 20/10 |

Primary Examiner—Georgia Y. Epps
Assistant Examiner—P. W. Huber
Attorney, Agent, or Firm—Limbach & Limbach L.L.P.

[57] ABSTRACT

A recording and/or reproducing apparatus for a disc shaped recording medium having a first recording region in which an information signal is recorded using pits and a second recording region in which an information signal is recorded using a magneto-optical method includes a rotational driving unit, a servo apparatus and a controller. A head moves between the first and second recording regions of the disc-shaped recording medium and records and reproduces information signals to and from the disc-shaped recording medium. The rotational driving unit rotates the disc-shaped recording medium at a constant linear velocity by using the output signal outputted from the head. The servo apparatus generates a servo signal according to an error signal generated using the output signal from the head and carries out servo control on the head and the rotational driving unit. The controller determines which of the first or second regions of the disc-shaped recording medium the head is in based on the output signal from the head and then uses this determination result to control the servo apparatus.

6 Claims, 14 Drawing Sheets

DUAL MORE RECORDING AND REPRODUCING APPARATUS HAVING TWO RECORDING REGIONS USING DIFFERING REPRODUCTION PRINCIPLES

This is a continuation of application Ser. No. 08/449,264 filed on May 24, 1995, and now abandoned, which is a divisional of co-pending application Ser. No. 08/255,467 filed on Jun. 8, 1994.

BACKGROUND

1. Field of the Invention

The present invention relates to a recording and/or reproducing apparatus for a disc-shaped recording medium. More the present invention relates to a recording and/or reproducing apparatus for reproducing information signals having differing reproduction principles which are recorded on a disc-shaped recording medium.

2. Background of the Invention

Systems using optical discs and magneto-optical discs as a recording medium where the user can reproduce or record data such as music data are well known. For example, optical disc reproducing apparatuses such as CD (Compact Disc) players are dedicated to reproduce only, and recording and/or reproducing apparatuses which use magneto-optical discs can both reproduce and record data.

While data is reproduced from the optical disc by this kind of recording and/or reproducing apparatus, a light beam is radiated onto the signal recording surface by an optical head and data is then read out by detecting the light beam which is reflected by the recording surface. In order that the light beam be radiated in an appropriate manner, a tracking servo and a focusing servo control the position of an objective lens within the optical head and a sled servo feeds the optical head in a radial direction of the disc.

Also, the operating modes, for example, the tracking operation modes and the spindle servo modes at the time of recording and reproducing are different for read only type optical discs such as CDs, where the information is physically formed as convex or concave-shaped pits, and magneto-optical discs, where magneto-optical areas are provided in which the user can record information.

It therefore follows that with recording and/or reproducing apparatuses for optical discs which have both regions in which the information is recorded using pits, hereinafter referred to as pit regions, and recordable regions which are capable of being recorded in, it is necessary to switch over between the tracking operation mode and the spindle servo mode.

When the optical disc is a magneto-optical disc on which the user can, for example, record music etc., a pit region 80a is provided at the innermost side of the disc, as shown in FIG. 1(a). At this pit region, TOC information (referred to hereinafter as a "P-TOC") for managing the disc attributes and recorded data etc. is recorded using pits. This is followed by a recordable region 80b, in which management information (referred to hereinafter as a "U-TOC") to be used in re-writing by the user is recorded along with usual data such as music etc.

A wobbled pregroove is formed at the recordable region 80b. The address information for this pregroove is then formed by wobbling using, for example, an FM modulated signal. By using the pregroove in this way, address information, which in this case is absolute position information, can be deduced even for recordable regions where there is no data recorded. Naturally, when data is being recorded no address exists for the data, so the recording operation can be controlled using address information obtained from the pregroove.

A hybrid-type optical disc is one in which the recording region includes a pit region, and a recordable region is also provided, as is shown in FIG. 1(b). This hybrid type optical disc has data such as a P-TOC and/or music data recorded in the pit region as data exclusively for reproducing, and is also capable of having data such as a U-TOC and music data recorded in the recordable region. This means that it is possible to record data such as music etc. as read only data which cannot be overwritten together with data which can be overwritten on the same optical disc.

However, with regards to discs on which the pit region and the recordable region exist together, the principles behind recording and reproducing back from and to a pit region and from and to a recordable region are different, and their data read out methods are not compatible. It follows that when reading data from these respective regions, a system controller for the recording and/or reproducing apparatus has to change over between the tracking operation mode and the spindle servo mode in order to correspond with the region which is to be scanned by the optical head.

For example, with the optical disc in FIG. 1(a), when the optical disc is loaded into the apparatus, the tracking operation mode is first put into the mode for scanning the pit region and the TOC information is read out. Next, when data such as music is actually being recorded or reproduced, the optical head is fed towards the outside of the disc, and the tracking operation mode is put into the mode for scanning the recordable region (hereinafter referred to as "MO model") and the data is read out. The recording/reproducing of data etc. is then achieved by having the optical head access a prescribed position using the address data which was read out.

When reading out usual data using the optical head 82, that is to say, when reading out data from the MO region 80b, the output signal for a photodetector PD is supplied to an RF amplifier 83 (see FIG. 2) where it undergoes arithmetic processing and amplification processing. This photodetector PD is constructed from a four division detector which has a pair of side spot detectors and a pair of RF signal detectors at its center.

At the RF amplifier 83, items such as the reproducing data, focus error signal and tracking error signal are generated by performing arithmetic processing on the output from the photodetector PD. These signals and their corresponding circuit systems are, however, omitted from this explanation.

A push-pull signal for extracting the address modulation information which detects the pregroove, for example the information from the four-partition detector in the arithmetic amplifier 83a of the RF amplifier 83, is used as the signal for operating the spindle servo system.

An address decoder 84 is a circuit for demodulating information from the aforementioned pregroove and then extracting the address information from this demodulated information. The signal for the spindle servo is also extracted by the address decoder 84.

For example, at the address decoder 84, the groove information is put into binary after being passed through a band pass filter of a prescribed central frequency and biphase data is deduced using PLL demodulation. Also, a clock signal of a prescribed frequency is reproduced by putting this biphase data through PLL processing and this bit clock is also used as rotational speed information for the spindle.

The signal for use with the spindle servo extracted from the address decoder 84 is supplied to a signal processing unit 85. The signal processing unit 85 then generates a spindle error signal $ES_{AD}$ necessary for a servo circuit 86, which operates the spindle servo, to control the number of rotations of the spindle motor 81.

Also, while the optical head 82 reads the pit region 80a, the RF signal obtained at the arithmetic amplifier 83b in the RF amplifier 83 is sent to the signal processing unit 85. A spindle error signal $ES_{EFM}$ is then generated from the bit clock which is being reproduced and this is then outputted. For example, a synchronization signal is extracted from the EFM signal for the data which is generated to decode the RF signal. This is injected into the PLL circuit and a reproduction bit clock is obtained from this PLL circuit. This reproduction bit clock is then compared with the standard system clock and an error signal $ES_{EFM}$ is obtained.

By then comparing the level of the inputted spindle error signals $ES_{AD}$ or $ES_{EFM}$ with a prescribed standard value, the servo circuit 86 can determine whether or not the current rotational speed of the spindle motor 81 is faster or slower than the regulation speed. If the rotational speed of the spindle motor is not the regulation speed, the servo circuit 86 generates a motor control signal SPO for correcting this and supplies this to the motor driver 87.

The rotational speed of the spindle motor 81 can be accelerated or decelerated with regards to the forward direction depending on whether the current applied from the motor driver 87 is positive on negative, so that a normal operating speed can be maintained.

For example, if the spindle motor 81 is rotating slowly, a forward current is applied based on the motor control signal so as to provide acceleration. If the rotational speed is fast, a current is applied in the reverse direction based on the motor control signal SPO so as to provide deceleration.

Unfortunately, the recording and/or reproducing apparatus for magneto-optical discs which have both pit regions and recordable regions cannot distinguish between a pit region and a recordable region while the optical head is actually scanning these regions and may lapse into a state where it cannot read out the data.

For example, when reading out data from the recordable region 80b of the optical disc 80, if the apparatus is affected by interference such as impacts or vibration, or if a large error occurs in the data which is read out for whatever reason, the optical head 82 may scan into the pit region 80a.

As the tracking operation modes for the pit region 50a and the recordable region 80b differ, it is no longer possible to carry out an appropriate tracking operation if, for example, the pit region 80a is entered into while the apparatus is still in the mode for a recordable region.

If the tracking operation cannot be carried out as usual, the data cannot be read. The recording and/or reproducing apparatus will therefore not be able to return to normal operation, with the reason why being unclear.

This is the same if the optical head 82 goes from the pit region 80a into the recordable region 80b as a result of interference etc.

Also, with recording and/or reproducing apparatus equipped with the kind of spindle servo apparatus shown in FIG. 2, there is a problem where the spindle motor may rotate quickly or rotate in a reverse direction, so as to go into servo run away.

For example, if the apparatus is subjected to interference such as an impact or vibration etc. or a large error occurs in the data being read out for whatever reason, the light beam scanning process being carried out by the optical head 82 may go into the pit region 80a while reading data from the recordable region 80b of the disc 80.

The spindle servo methods for this kind of pit region 80a and recordable region 80b are different. For this reason, if the pit region 80a is entered while still in the reading mode for the recordable region 80b, the signal supplied to the signal processing unit will be completely inappropriate. As a result of this, the signal for the spindle error signal ES will no longer function as a CLV (Constant Linear Velocity) control signal. The result of a completely inappropriate signal applied for the functioning of the spindle servo loop may result in reverse rotation if a decelerating current is continuously applied to the spindle motor 81 in the reverse direction. Alternatively, rotation of an extremely high speed may occur in the forward direction for the spindle motor.

If this kind of servo run away occurs, it is, of course, not possible to recover the spindle motor from this run away state using servo control and it is therefore not possible to return the spindle motor to normal operation.

In particular, once the spindle motor 81 starts to rotate in the reverse direction, even if the optical head 82 could return to the recordable region 80b, the data read out would not be the same data. The servo information could therefore not be extracted accurately and appropriate rotation conditions for the spindle motor 81 could not be returned to. In other words, the spindle motor 81 could not be brought out of a state of reverse rotation and recording/reproduction would not be possible.

This is the same if the optical head 82 goes from the pit region 80a into the recordable region 80b.

When the spindle servo has stopped functioning in this way, it is possible to consider turning off the motor power supply so that the spindle motor 81 will come to a halt as a way of resolving temporary spindle runaway. However, it will not be possible to return the spindle motor to normal operation quickly using this method.

This kind of problem occurs not only when shifting between a recordable region and a pit region, but also, for example, when making an access within the same region (it follows that this problem also occurs in reproducing apparatus with discs which only have pit regions).

This is to say that both the tracking servo and the sled servo have to be turned off during the access of the optical head 82, but the aforementioned signal for generating a spindle error signal ES required to do this cannot be read. Because of this, it is extremely difficult to maintain the rotational speed of the spindle motor within a range which can be reined in by the spindle servo.

Also, when the optical head 82 goes to the innermost position or the outermost position on the disc, so that a reading operation from a signal recording part of the disc known as a "Miller surface" is to be carried out, the signal for generating the spindle error signal ES cannot be obtained. This means that the spindle servo cannot be applied in a suitable manner.

SUMMARY OF THE INVENTION

It is, therefore, an object of the present invention to provide a recording reproducing apparatus for a disc-shaped recording medium which resolves the problems mentioned above.

According, to the present invention, there is provided, a recording and/or reproducing apparatus for a disc-shaped recording medium, with information signals being recorded in first and second recording regions of the disc-shaped recording medium using recording methods which require different reproduction techniques, which includes a head, a rotational unit, a servo controller and a controller. The head is for feeding between, recording on, and reading out data from the first and second recording regions of the disc-shaped recording medium. The rotational unit is for rotating the disc-shaped recording medium based on an output signal from the head. The servo controller is for generating a servo signal based on an error signal generated using the output signal from the head, and exerting servo control upon the head and the rotational unit. Also, the controller is for determining whether the head is positioned in the first region or the second region of the disc-shaped recording medium based on the output signal from the head, and controlling the servo control unit based on the result of this determination.

Also, according to the present invention, there is provided a recording and/or reproducing apparatus for a disc-shaped recording medium having first and second recording regions, with information signals being recorded using pits in the first recording region, and information signals being recorded using a magneto-optical method in the second region. This recording and/or reproducing apparatus includes a head, servo control unit and a controller. The head is for moving between, recording on, and reproducing data from the first and second recording regions of the disc-shaped recording medium. The servo control unit is for generating a tracking servo signal based on a tracking error signal generated using the output signal from the head, and exerting servo control upon the head. Also, the controller is for determining whether the head is positioned in the first region or the second region of the disc-shaped recording medium based on the output signal from the head, and controlling the servo control unit by using the result of this determination.

Further, according to the present invention, there is provided a recording and/or reproducing apparatus for a disc-shaped recording medium having first and second recording regions, with information signals being recorded using pits in the first recording region, and information signals being recorded using a magneto-optical method which employs a pregroove in the second region. This recording and/or reproducing apparatus for a disc-shaped recording medium includes a head, spindle motor, first, second and third spindle control signal generating units, a rotation detector and a controller. The head is for moving between, recording on, and reproducing data from the first and second recording regions of the disc-shaped recording medium. The spindle motor is for rotating the disc-shaped recording medium. The first spindle control signal generating unit is for generating a first spindle control signal based on data read out from the second recording region of the disc-shaped recording medium by the head. The second spindle control signal generating unit is for generating a second spindle control signal according to data read out from the first recording region of the disc-shaped recording medium by the head. The rotation detector is for detecting the number of rotations of the spindle motor. The third spindle control signal generating unit is for generating a third spindle motor control signal according to a signal from the rotation detector. Also, the controller is for determining whether the head is positioned in the first region or the second region of the disc-shaped recording medium according to the output signal from the head. The controller selects the first, second and third spindle control signals outputted from the first, second and third spindle control signal generating units according to the determination result and controls the spindle motor to supply the selected spindle control signal. In the present invention, while recording and/or reproduce operations are being carried out on a disc-shaped recording medium having first and second recording regions, if a movement of the head occurs from one recording region over to the other recording region for whatever reason so that the recording or reproducing operation cannot be carried out in the usual manner, the operation mode for the tracking servo or the spindle servo can be changed over. This has the effect of preventing run-away of the tracking servo or the spindle servo and means that data can be read from the disc-shaped recording medium in a stable manner even after a shift has occurred. Also, the position of the head above the disc-shaped recording medium can be easily confirmed so that it is easy to return to the original position.

Further, as there are three spindle control signal generating units set up in the present invention, by using the control signals from the three spindle control signal generators, servo control of the disc rotation unit (i.e. the spindle motor) can be carried out even when data cannot be read from the disc-shaped recording medium. This means that spindle run-away can be prevented even when it is not possible to read data from the disc-shaped recording medium.

BRIEF DESCRIPTION OF THE DRAWINGS

FIG. 1(a) shows a magneto-optical disc and FIG. 1(b) shows a hybrid magneto-optical disc.

FIG. 6(a) is a wave diagram showing the waveform for the signal GFS.

FIG. 7(a) is a flowchart for the case of reproducing from a pit region and FIG. 7(b) is a flowchart for the case of reproducing from a recordable region.

FIG. 8(a) is a flowchart for the case of reproduction from a pit region and FIG. 8(b) is a flowchart for the case of reproducing from a recordable region.

DESCRIPTION OF THE INVENTION

First Embodiment

In the following, a detailed description will be given of the recording and/or reproducing apparatus for a disc-shaped recording medium for the present invention. The recording and/or reproducing apparatus for a first embodiment of this invention will be described with reference to FIGS. 3 through to 7.

This first embodiment is a recording and/or reproducing apparatus for operating a recordable magneto-optical disc and a read-only type optical disc.

Figure 1A:
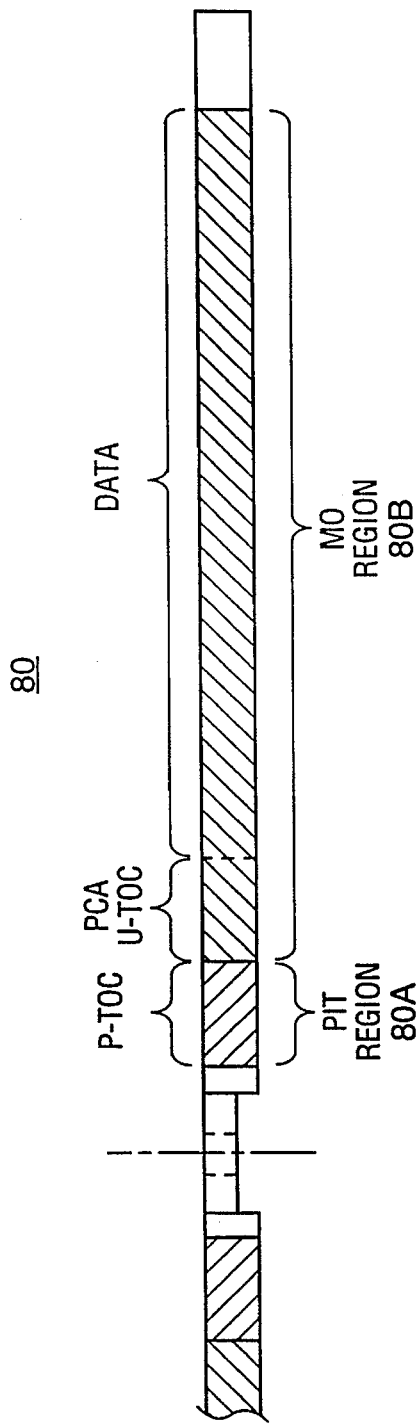
FIGS. 1(a) and 1(b) are views describing the structure of a magneto-optical disc and a hybrid magneto-optical disc, where
Figure 1B:
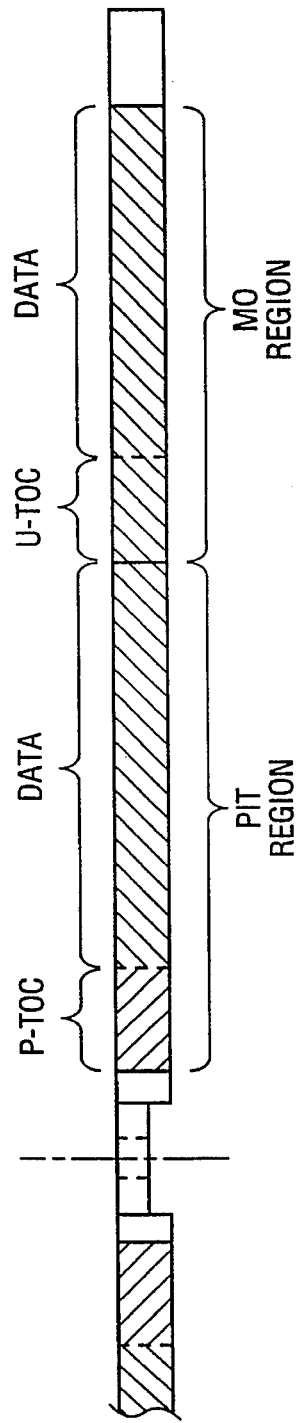
Figure 2:
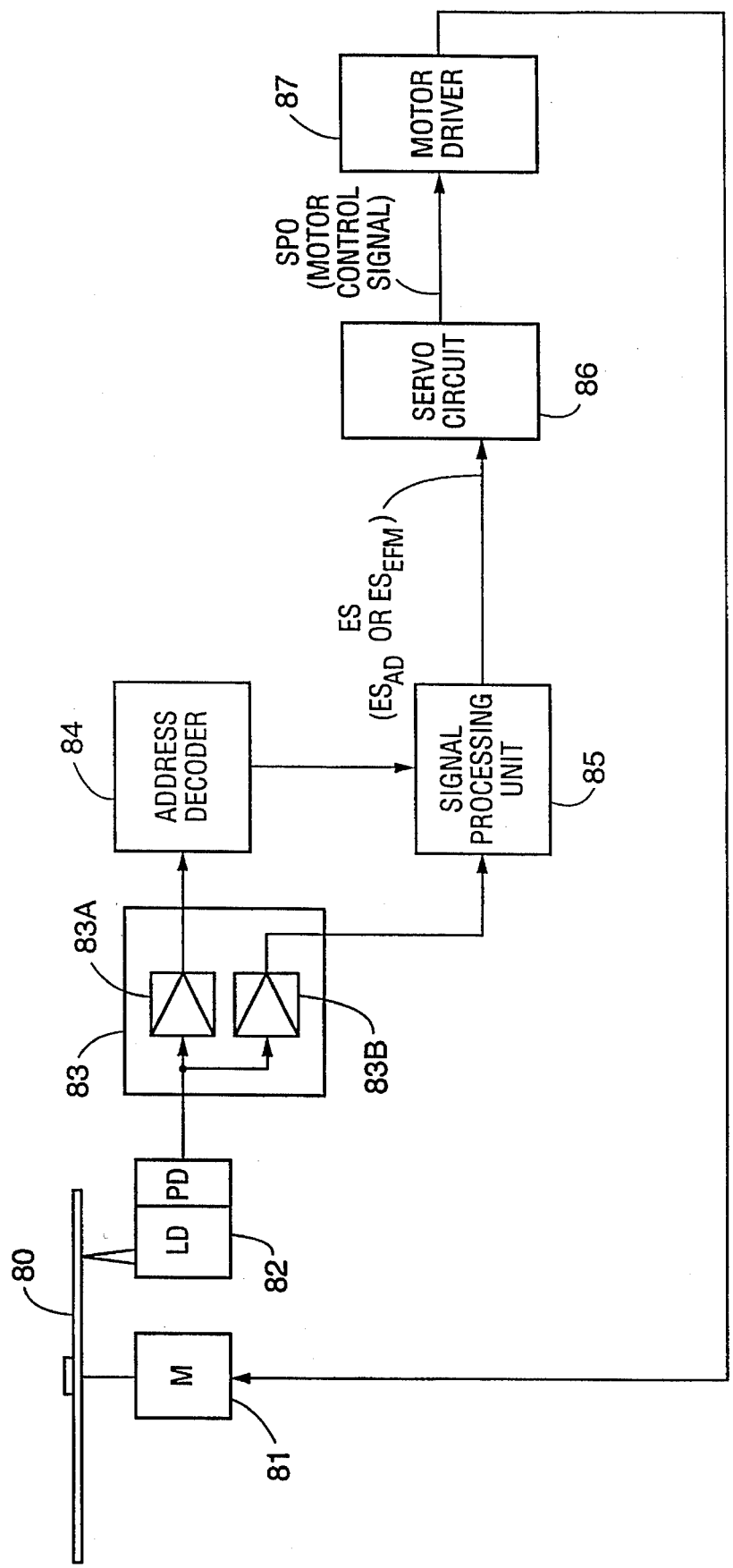
FIG. 2 is a block diagram of a spindle servo apparatus prior to that of the present invention.
Figure 3:
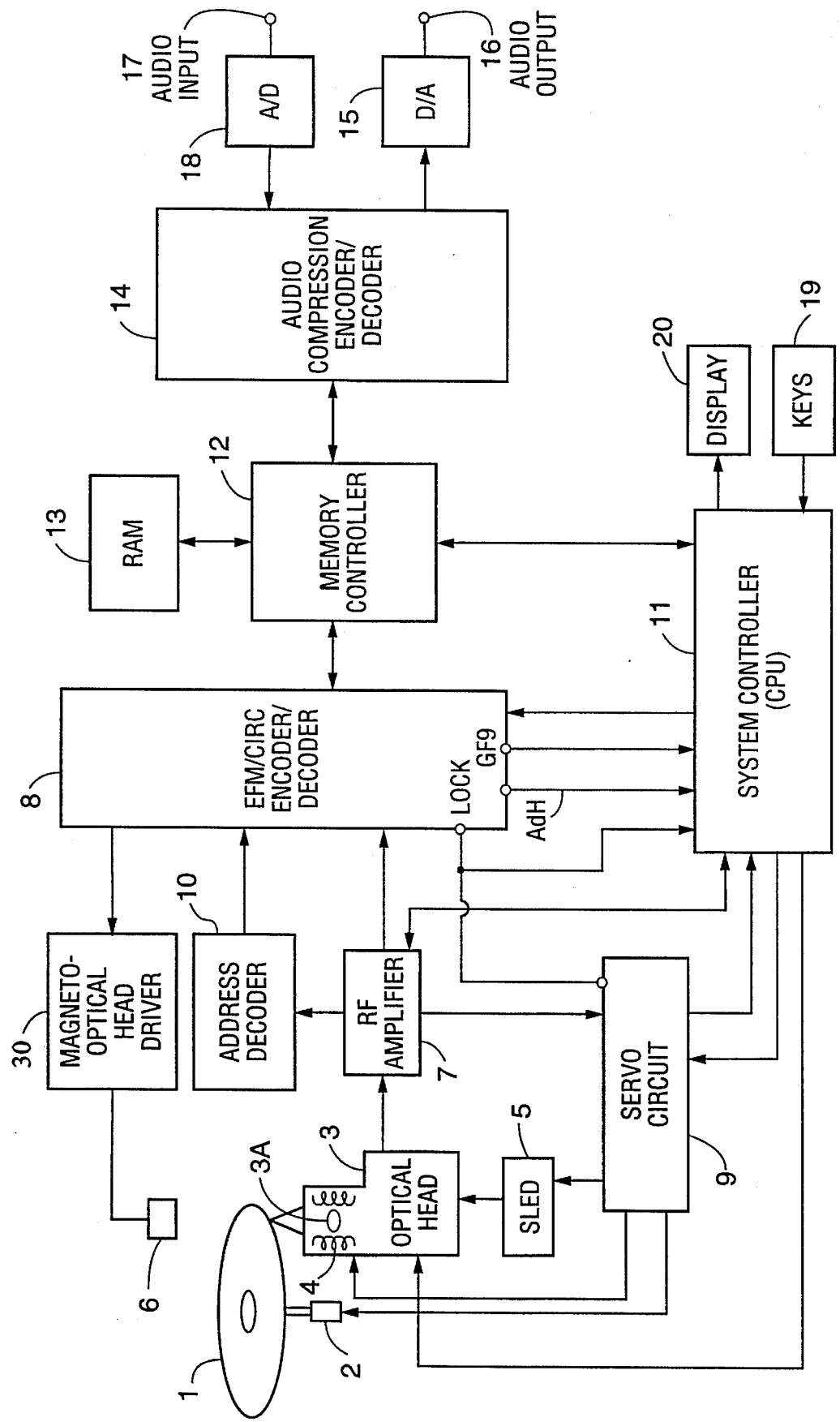
FIG. 3 is a block diagram of a recording and/or reproducing apparatus for disc-shaped recording media in a first embodiment of the present invention.

In FIG. 3, a reference numeral 1 indicates an optical disc or a magneto-optical disc which is rotated by a spindle motor 2. A reference numeral 3 indicates an optical head which radiates a light beam onto the disc 1 during recording and reproduction. This optical head 3 emits a high level light beam for heating a recording track of the magneto-optical disc to the Curie temperature, and a relatively low level light beam for reading out data using the light beam reflected by the optical disc 1 due to the magnetic Kerr effect during reproduction.

There is a read-only type optical disc and a magneto-optical disc as the disc 1. The recording area of the read-only type 20 optical disc records the information with pits. The magneto-optical disc has a first region where the TOC information is recorded by pits and a second region which is the user's recordable TOC information and music data. The magneto-optical disc in this case would be a hybrid type disc having audio data tracks for music data etc., which are formed using pits along with audio tracks formed using a magneto-optical recording method.

The read-only type optical disc and the pit region of the magneto-optical disc, records data in pit shapes, in the same way as for CDs. The optical head 3 outputs the RF signal by using the corresponding changes in the diffraction level of the reflected light beam, depending on whether or not there is a pit present, in the same way as a CD player, rather than using the magnetic Kerr effect. Naturally, the recording operation, which depends on the magnetic field modulation method later explained, is not executed for the read-only type optical disc and the pit regions of the magneto-optical disc.

In order to execute, data reading operations from this kind of disc 1, the optical head 3 has an optical system composed of a laser diode, a polarized beam splitter, an objective lens 3a, and a photodetector for detecting the reflected light beam. The objective lens 3a is held by an actuator 4 and is moved in a radial direction of the disc 1 (for teaching), and in a parallel direction of the axis of the objective lens 3a (for focusing) by the actuator 4. Also, the whole of the optical head 3 is supported so as to be capable of being moved across the diameter of the disc by a sled mechanism 5. A reference numeral 6 indicates a magnetic head for applying a vertical magnetic field modulated for supplying recording data to the magneto-optical disc. This magnetic head 6 is arranged in such a manner that the disc 3 becomes sandwiched between this magnetic head 6 and the optical head 3.

In reproduction operation, the output signal from the optical head 3 is supplied to an RF amplifier 7. The RF amplifier 7 generates an RF signal as an EFM signal, a tracking error signal, a focus error signal, groove information for absolute position information and focus information for the FOK signal etc. by processing the output signal of the optical head 3. The generated RF signal is then supplied to an encoder/decoder 8. Also, the tracking error signal and the focus error signal are supplied to a servo circuit 9. The absolute position information is pre-recorded on the optical disc 1 in the form of the wobbled as mentioned previously.

The servo circuit 9 generates a spindle servo signal and other servo signals according to the supplied tracking error signal and the supplied focus error signal and further generates drive signals according to a track jump command or an access command supplied from a system controller 11. The servo circuit 9 executes a focusing servo and a tracking servo to control the actuator 4 and the sled mechanism 5 and controls the spindle motor 2 to rotate at a constant linear velocity (CLV).

The RF signal is put through a decoding process such as an EFM demodulation, which is an error correction at the encoder/decoder 8. The output digital data is temporarily stored in a buffer memory 13 by the memory controller 12. The reading out of data from the magneto-optical disc 1 using the optical head 3 and the transfer of digital data from the optical head 3 to the buffer memory 13 is carried out intermittently at 1.41 Mbits/sec. The buffer memory 13 is used as RAM with a storage capacity of 1 Mbyte to 4 Mbytes.

The digital data written into the memory 13 is read out at a timing which is such that the data transfer is at 0.3 Mbits/sec, and this is then supplied to an encoder/decoder 14. The data read out from the buffer memory 13 by the encoder/decoder 14 undergoes reproducing signal processing so that, for example, a decoding processes as an expanding process can be executed, and the digital signal is supplied to a D/A converter 15. The digital signal from the encoder/decoder 14 which is supplied to the D/A converter 15 is converted into an analog signal by the D/A converter 15 and the a prescribed analog signal as the playback output is supplied to a prescribed amplification circuit via a terminal 16. The playback output is outputted for example, as left and right channel audio signals.

In aforementioned recording and/or reproducing apparatus, the digital data read out from the disc 1 is intermittently written in the buffer memory 13 at the high speed transfer rate and read out from the buffer memory at the low transfer rate. The digital data is outputted and converted audio sound. As a result, the audio sound is outputted without interruption, even if, for example, the tracking servo goes out.

Absolute position information obtained from the decoded pregroove information or address information recorded as data outputted from the address decoder 10 is supplied to the system controller 11 via the encoder/decoder 8 so it can be used in each of the various control operations. Also, synchronization signal detection information, a servo monitor signal, a GFS (Guard Frame Synchronization) signal and a lock signal etc. are supplied from the encoder/decoder 8 to the system controller 11. The GFS signal and the lock signal are described below.

When the information signal records to the disc 1, in this case a magneto-optical disc, an analog audio signal as a recording signal inputted from a terminal 17 is converted into a 5 digital audio signal by an A/D converter 18. The digital audio signal from the A/D converter 18 is supplied to the encoder/decoder 14 and is processed with audio compression encoding. The compressed digital data of the encoder/decoder 14 is temporarily stored in the buffer memory 13 by the memory controller 12 and read out from the memory 13 at predetermined timing. The digital data read out from the memory 13 is supplied to the encoder/decoder 8 and is processed with CIRC encoding and EFM modulation by the encoder/decoder 8. The digital data outputted from the encoder/decoder 8 is supplied to a magnetic head drive circuit 30.

The magnetic head drive circuit 30 supplies a magnetic head drive signal to the magnetic head 6 in accordance with the recording data processed by the encoder/decoder 8. N-pole or S-pole vertical magnetic fields modulated according to the recording data are applied to the magneto-optical disc by the magnetic head 6. At this time, the system controller 11 controls the optical head 3 to emit the light beam with a recording level.

A reference numeral 19 indicates an operation input area which is provided with keys for inputting user operations and a reference numeral 20 indicates a display unit which may be, for example, a liquid crystal display unit.

The magneto-optical disc 1 has recorded TOC information, such as managing data, to manage an area in which data (such as music) has already been recorded and an area which is a recordable area.

So, at a time just before the disc 1 is loaded into the recording/reproductive apparatus or just before a recording or reproduction operation is performed, the system controller, 11 drives the spindle motor 2 and the optical head 3 and the data in the TOC region at the innermost side of the optical disc 1 is read out. The TOC information read out by the optical head 3, which is supplied to the memory controller 12 via the RF amplifier 7 and the encoder/decoder 8, is stored in a prescribed region of the buffer memory 13. The TOC information stored in the buffer memory 13 is then used to control the recording/reproduction operations of the disc 1.

With the kind of recording and/or reproducing apparatus shown in FIG. 3, it is possible to read data from either the pit region or the recordable region on the disc 1. In order to achieve this, pit mode and MO mode tracking operation modes have to be prepared wherein switching over between these regions can be executed.

Figure 4:
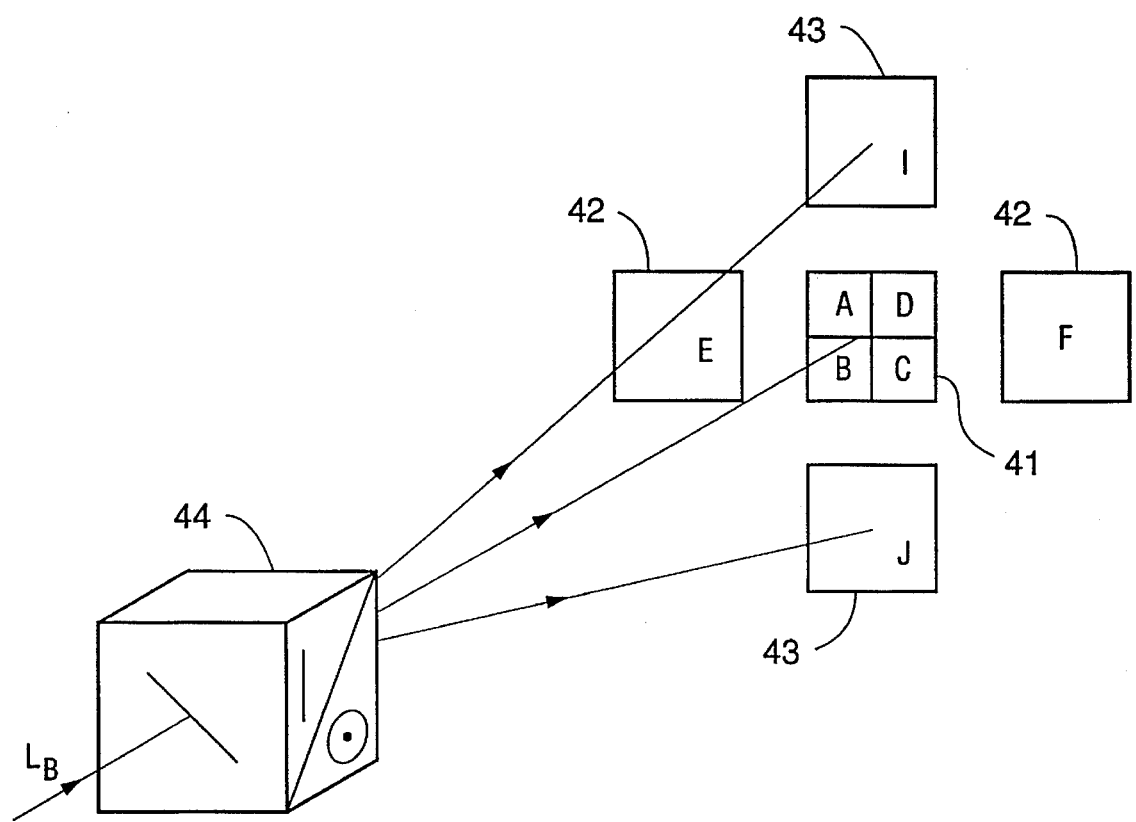
FIG. 4 is a view describing the structure of a photodetector for an optical head used by the recording and/or reproducing apparatus for disc-shaped recording media in the present invention.
Figure 5A:
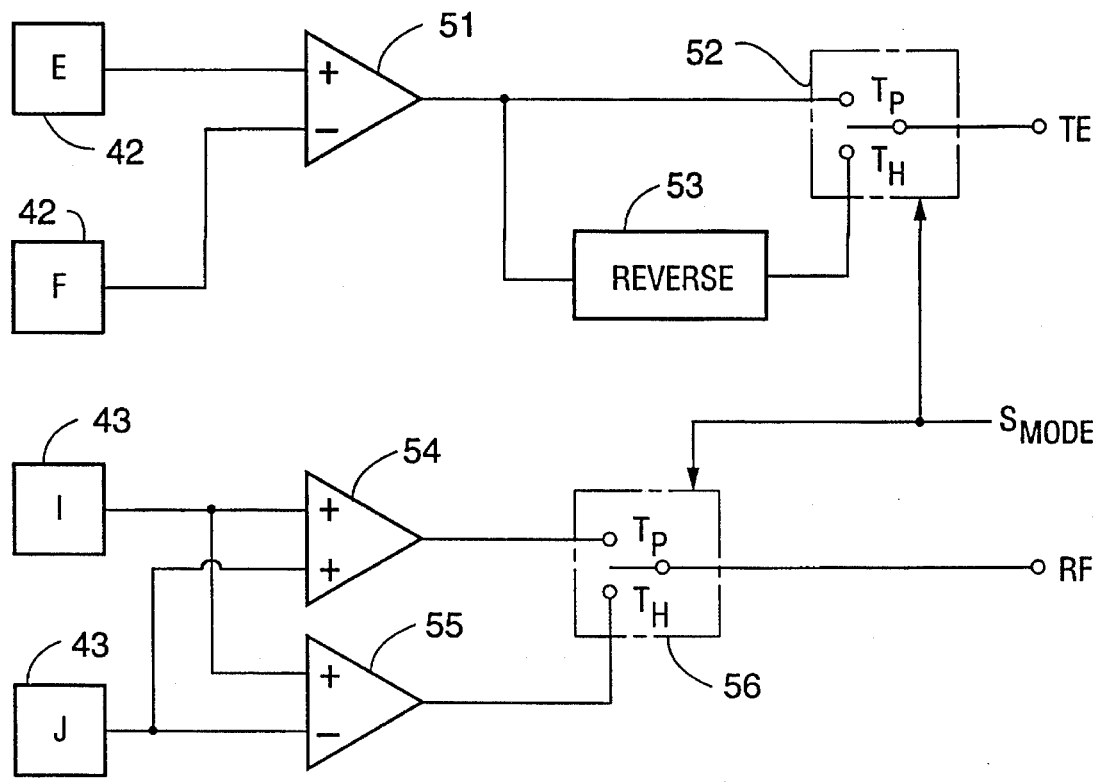
FIGS. 5(a) and 5(b) are a block diagram showing the structure of an RF amplifier used by the recording and/or reproducing apparatus for disc-shaped recording media in the present invention.
Figure 5B:
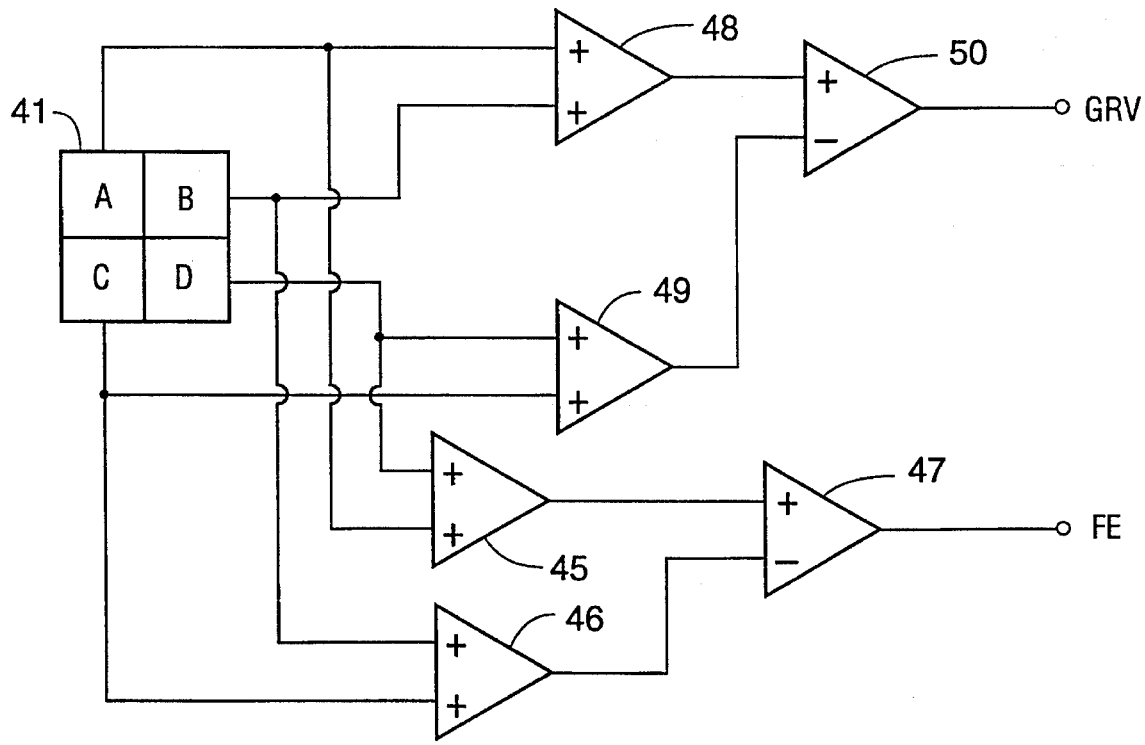
Figure 6A:
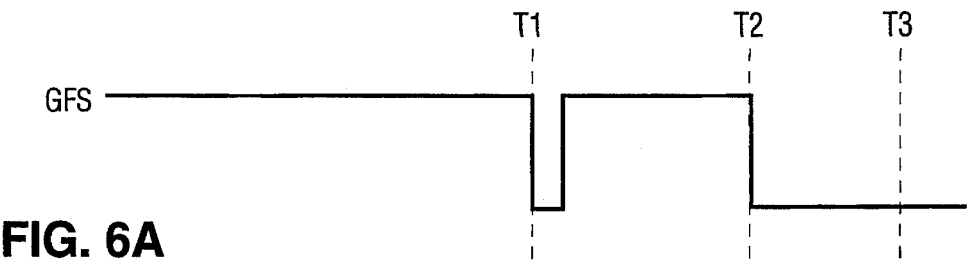
FIGS. 6(a) through to 6(e) are wave diagrams for the signals outputted from the encoder/decoder, where
Figure 6B:
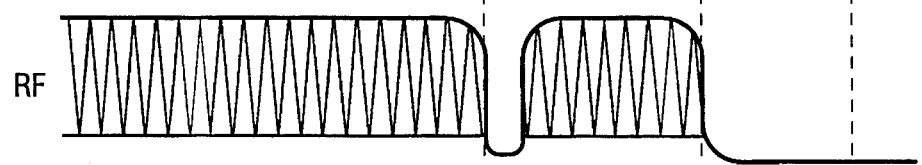
FIG. 6(b) is a wave diagram showing the waveform for the RF signal.
Figure 6C:
FIG. 6(c) is a wave diagram showing the waveform for the tracking error signal.
Figure 6D:
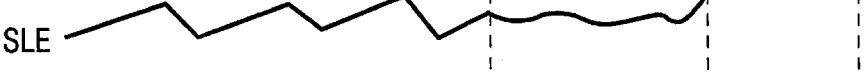
FIG. 6(d) is a wave diagram showing the waveform for the sled error signal and FIG. 6 (e) is a wave diagram showing the waveform for the clock signal.
Figure 6E:
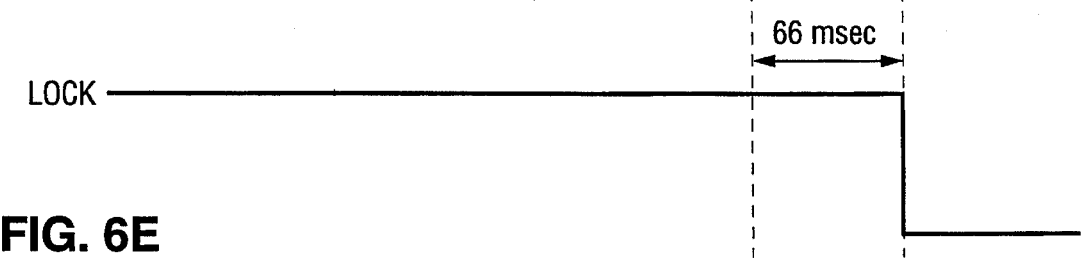

FIG. 4 and FIGS. 5(a) and 5(b) describe each of these tracking modes. FIG. 4 shows the detector portions for the optical head 3.

The optical head 3 for detecting the reflected light beam radiated onto the optical disc 1 by the laser diode is composed, as is shown in FIG. 4, of a four partition detector 41 split up into four parts (A, B, C, D), a side spot detector 42 (E, F) and an RF detector 43 (I, J). A reference numeral 44 indicates a 3 beam Wollaston prism for detecting the polarized direction of the reflected light beam LB. The Wollaston prism is composed of two single axial optical crystal elements as a rock-crystal, and the light beam is divided into three directions depending on the difference in the polarization of the incident light beam. The Wollaston prism is referred to in U.S. Pat. No. 4,771,414.

The three light beams generated by the 3 beam Wollaston prism 44 are converged on the four partition detector 41 and the RF detector 43, 43.

In addition to the main spot, a pair of side spots are also emitted from the laser diode and radiated on the disc 1. The reflected light beams corresponding to the side spots are converged on the side spot detector 42, 42.

The RF amplifier 7 generates each of the various aforementioned signals using each of the aforementioned arithmetic processes in response to these detectors 41, 42 and 43.

As shown in FIGS. 5(a) and 5(b), first, the focus error signal and the groove information GRV are generated using the four-partition detector 41.

The focus error signal FE is generated by adding (A+D) at adder 45, adding (B+C) at an adder 46 and then performing the arithmetic { (A+D)–(B+C)} at a subtractor 47. In this way, the focus error signal FE may then be supplied to the servo circuit 9.

The push-pull signal is then generated by adding (A +B) at an adder 48, (C +D) at an adder 49 and then performing the arithmetic {(A+B)–(C+D)} at a subtractor 50. This push-pull signal is supplied to the address decoder 10 as groove information GRV and the address information recorded as a wobbled pregroove at the recordable region is demodulated. This groove information GRV is also used for the generation of the spindle control signal during operation in the recordable region.

The tracking error signal TE is generated by subtracting (E–F) at a subtractor 51. The tracking error signal TE detected at E and F of the detector 42 from the light beam which is reflected by the side spot light radiated on the pit edges of the pit region. The tracking error signal for the recordable region is obtained in the same way by using the edges of the pregroove, but the signal is of reverse polarity.

It follows that the output signal from the subtractor 51 can be used without modification as the tracking error signal TE for the pit region. However, the output signal from the subtractor 51 first has its polarity reversed at a reversing circuit before being used as a tracking error signal TE in the recordable region. A changeover unit 52 for this purpose is therefore changed over by a mode control signal $S_{MODE}$ from the system controller 11 so as to be connected to a terminal TP during scanning of the pit region and to a terminal TM during scanning of the recordable region. The tracking operation mode can therefore be changed over to correspond with the region being accessed.

The RF signal is extracted from the detector 43, 43 in the case of both the recordable region and the pit region.

I and J are added together at the adder 54, the RF signal for the sum of which is outputted to be the RF signal corresponding to the pit region.

J is then subtracted from I at the subtractor 55, the RF signal for the difference signal of which is outputted as the RF signal for the recordable region recorded using a magneto-optical recording method.

A changeover unit 56 is connected over to the terminal TP by a mode control signal $S_{MODE}$ during scanning of the pit region and is then connected over to the terminal TH during scanning of the recordable region. As a result, RF signals are outputted in accordance with the respective regions which are supplied to the encoder/decoder 8.

The encoder/decoder 8 generates the GFS signal and a lock signal in the way described previously and supplies them to the system controller 11. These signals are described to use FIGS. 6(*a*) to 6(*e*). Here, FIG. 6(*a*) shows the GFS signal, FIG. 6(*b*) shows the RF signal, FIG. 6(*c*) shows the tracking error signal, FIG. 6(*d*) shows the sled error signal and FIG. 6(*e*) shows the lock signal.

A sled run away prevention circuit is set up so that sled mechanism run away can be control locked based upon the clock signal provided to the servo circuit 9.

Namely, when the kind of lock signal shown in FIG. 6(*e*) changes to a low level, the servo circuit 9 locks the drive for the sled mechanism.

The lock signal is therefore generated according to the GFS signal as an interrupt detection signal for the RF signal.

The GFS signal is a high level signal when the frame synchronization signal extracted from the RF signal and the reference synchronization signal generated by and outputted from, for example, a crystal oscillator are in synchronization with each other, and the GFS signal is a low level signal when they are not. The GFS signal is a detection signal to detect when the RF signal is not read appropriately.

Usually, the system controller 11 is always monitoring the GFS signal. However, if the RF signal falls sufficiently due to the disc being damaged or the servo being out of place, the GFS signal becomes a low level signal. The system controller 11 then detects that the GFS signal has gone to a low level, so that an appropriate process, such as the audio output being muted, is executed.

With regards to the lock signal which mutes the sled servo in the aforementioned way, its generation is limited only to cases where the low level for the signal GFS continues for a certain period so as not to mute unnecessarily in cases such as damage to the disc. For example, at a time $T_1$ which can be shown in FIG. 6(*b*), the RF signal drops due to damage on the disc and in this case the GFS signal becomes to a low level. Under these circumstances, however, the execution of a sled mute would not be appropriate.

The period of low level GFS signal is counted and if it continues for a period of, for example, 66 msec, a low level lock signal is generated. i.e. if the GFS signal goes low at a time $T_2$, then the clock signal will first go low at a time $T_3$. This 66 msec corresponds to a 13.3 msec. frame synchronization signal not yet having been detected five times. In this way, if the frame synchronization signal drops for five periods or more, a drop in the RF signal at this time will be determined to have been caused by the servo being out of place.

Either way, by observing the GFS signal or the lock signal, the system controller 11 can detect that the RF signal has not been read. Also, in the above way, the address is reproduced from the groove information GRV and the monitor signal for the header which reproduces this address is also supplied to the system controller 11. As a result, it can be determined that the RF signal cannot be read out when the header address cannot be detected during scanning of the recordable region.

At the encoder/decoder 8, the lock signal is generated according to the GFS signal in the way described previously. In addition, an audio mute signal is generated and outputted by using the GFS signal or the lock signal, or by using the detection signal in the case where errors of the reproducing data which cannot correct the error by correcting processing with the CIRC.

In the aforementioned recording and/or reproducing apparatus for this first embodiment, the regions being scanned by the optical head 3 are determined for the magneto-optical disc having the pit region and the recordable region, and corresponding processes are then carried out in accordance with these determinations. This operation is described using FIGS. 7(*a*) and 7(*b*) which show the process for the controller 11.

FIG. 7(*a*) shows the process for the case for reproducing operation of the pit region in pit mode, i.e. the system controller 11 controls the changeover units 52 and 56 shown in FIG. 5 to be connected to the terminals TP by the mode control signal $S_{MODE}$. During this pit mode operation (F100), the system controller 11 is always observing via the RF signal, to see whether or not the data has been read appropriately (F101).

Various methods where circumstances showing that the data has been read inappropriately are detected, such as the GFS signal going to a low level for a certain period, a lock signal going to low level signal or the outputting of a mute signal, and may be used as the observation method.

The pit mode reproducing process, i.e. the reading of the P-TOC or the reproducing process of data recorded by pits of the hybrid type disc, continues (F101–F100) while the reproducing data is read in an appropriate manner.

Let us assume that the optical head 3 moves into the recordable region because of, for example, the influence of external interference. In this case, it is not possible to read the data due to it not being possible to control the tracking control operation.

To put it another way, when the optical head 3 cannot read out the data from the disc 1, it is determined that it is possible that accidental movement of the optical head from the pit region to the recordable region.

When the process proceeds from step F101 to F102, the tracking servo is first turned off. In continuing, the tracking operation mode is changed to be in the MO mode (F103). The system controller 11 controls the changeover units 52 and 56 shown in FIG. 5(*a*) so as to be connected to the terminals TH by the mode control signal $S_{MODE}$.

The tracking servo is then turned on (F104), and it is determined if the data has been read or not using the same means as for step F101 (F105).

Therefore, if the data cannot be read out from the disc because of an actual shift of the optical head into the recordable region, the optical head 3 is tracking controlled to change the tracking mode into the MO mode when the optical head 3 immediately moves to the recordable region. As a result, it is possible to read out the data from the recordable area by the optical head 3. The process can progress from step F105 to F106 and it can be determined that the region scanned by the optical head 3 is actually the recordable region.

If it is confirmed that the optical head 3 has accidentally moved into a recordable region, a prescribed process is executed so as to return to the corresponding pit region (F107). With regards to this process, the address of the position of the optical head 3 in the recordable region is determined by reading the current data and the servo which is also stable. The operation of returning the optical head 3 is simple. For example, the address for the position which the optical head 3 is currently scanning is determined, the distance to the pit region is calculated, and the access is carried out. It is also possible to change the tracking operation mode over to pit mode easily, after the optical head 3 has reached the pit region.

If the data is not read in step F105, the drop in the data level has been caused by something other than the optical head shifting between those regions, and a predetermined process is executed (F108). In this case, for example, the tracking mode is again put into the pit mode and a predetermined process is executed.

Figure 7B:
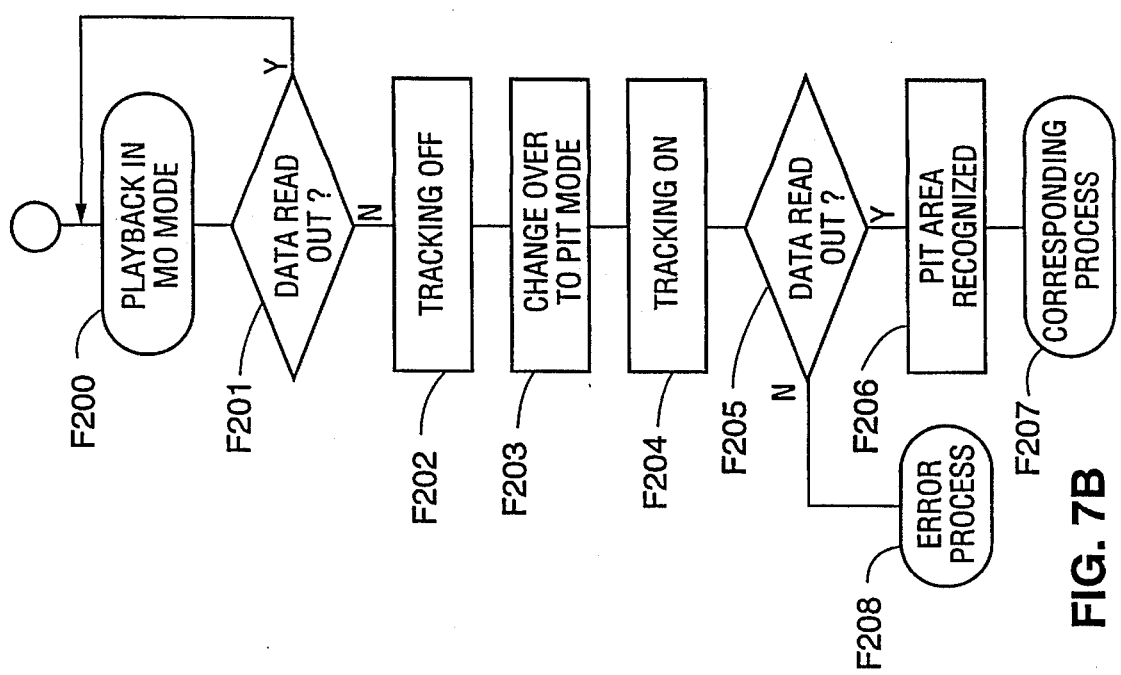
FIGS. 7(a) and 7(b) are flowcharts of the tracking operation mode changeover process for the first embodiment, where

FIG. 7(b) shows the process for the case where a recording or reproducing operation is being carried out in the MO mode to the recordable region. The system controller 11 controls the changeover units 52 and 56 shown in FIG. 5(a) to be connected to the 1. C@ terminals TH by the mode control signal $S_{MODE}$. During this MO mode operation (F200), the system controller 11 is always observing via the RF signal to see whether or not the data has been read appropriately (F201).

Methods where circumstances showing that the data has been read inappropriately are detected, for example, the GFS signal going to a low level for a certain period, the lock signal going low level signal or the outputting of a mute signal, may be considered for each of the various observation methods. It can also be determined whether or not the header of the address data obtained from the groove information GRV can be detected.

The MO mode reproducing process i.e. the reading/re-recording of the U-TOC information or the recording/reproducing of music data etc. as the MO data continues (F201–F200) while the reproducing data is appropriately read.

Let us assume that the optical head 3 moves into the pit region because of, for example, the influence of external interference. In this case, it is not possible to read out the data by the optical head 3 due to it not being possible to control the tracking servo.

Put another way, when it is not possible to read out the data by the optical head 3, it is determined that it is possible that accidental movement of the optical head 3 from the region has taken place.

When the process proceeds from step F201 to F202, the tracking servo is first turned off. In continuing, the tracking operation mode is changed to be the pit mode (F203). The system controller 11 then controls the changeover units 52 and 56 shown in FIG. 5(a) so as to be connected to the terminal TP by the mode control signal $S_{MODE}$ The tracking servo is then turned on (F204), and it is determined if the data has been read or not using the same means as for step F201 (F205).

Therefore, if the data cannot be read out from the disc because of an actual shift of the optical head into the pit region, the optical head 3 is tracking controlled to change the tracking mode into the pit mode when the optical head 3 immediately moves to the pit region. As a result, it is possible to read out the data from the pit region by the optical head 3. The process can progress from step F205 to F206 and it can be determined that the optical head has actually moved into the pit region.

If it is confirmed that the optical head 3 has accidentally moved into the pit region, a predetermined process is executed so as to return to the corresponding recordable region (F207). With regards to this process, the address position of the current data read out by the optical head 3 can be determined and the servo is also stable. The operation of returning the optical head 3 is simple. For example, the distance from the current address position of the optical head 3 to the recordable region is calculated and the access is executed. It is also possible to change the tracking operation mode over to the MO mode easily after the recordable region has been reached.

If the data is not read in step F205, it is determined that the drop in the data level has been caused by something other than the optical head 3 shifting between these regions, and a predetermined process is executed (F208). In this case, for example, the tracking operation mode is returned to the MO mode and a prescribed process is executed.

By having the recording and/or reproducing apparatus for this first embodiment carry out the above processes, even if the scanning position of the optical head 3 accidentally shifts between the pit region and the recordable region during operation, the operating conditions which preceded the shift can be easily returned to and there will not be a situation where an error state continues due to it not being possible to read out data.

By rapidly returning the optical head 3 in this way, the optical head 3 can be returned to its previous position and the reproducing operation can be re-started while the audio sound outputs continuously, so that the audio sound is not interrupted. This means that accidental shifting between regions will have no outwardly apparent effect.

Figure 7A:
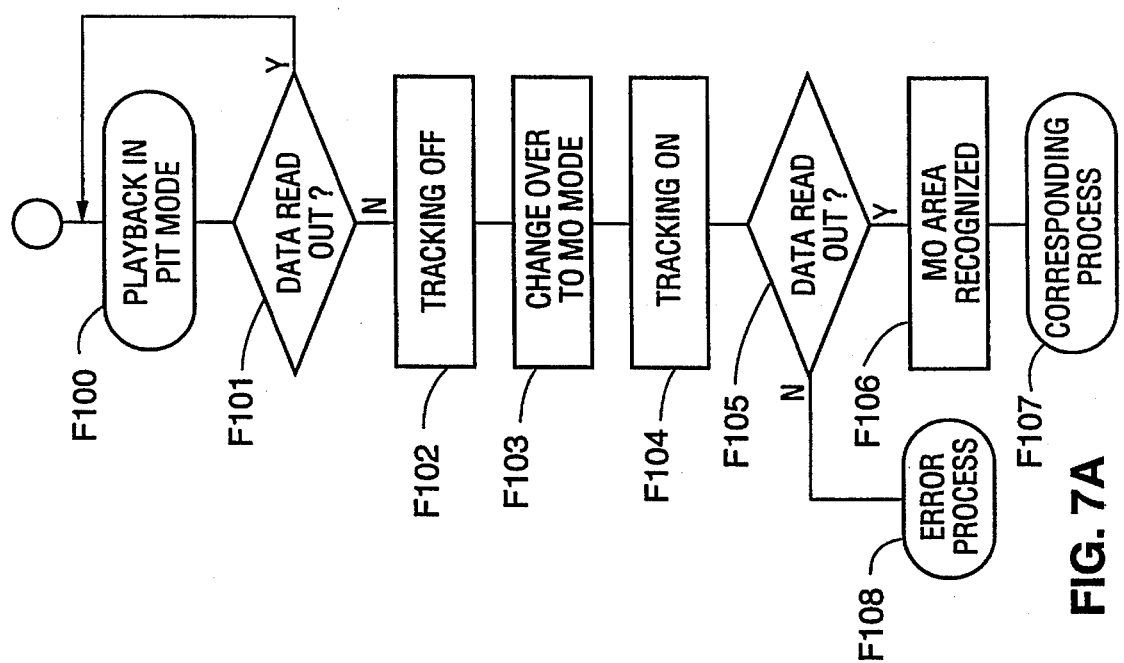

The process in FIGS. 7(a) and 7(b) is taken as one example of a process for changing over the tracking mode so as to execute a returning operation. However, this operation of changing over the tracking mode could be executed simply by using means for determining the present region.

Say, for example, the current position of the optical head 3 is not known to the system controller 11 at the time of turning the power supply on etc. It is possible to determine the region scanned by the optical head 3 by reciprocally changing the tracking operation mode over between the pit mode and the MO mode and detecting which mode conditions the data can be read in. If the data can be read in pit mode, then the current region is the pit mode region and if the data can be read in MO mode, then the current region is the recordable region. If the current position of the optical head 3 can be determined, it is then possible to start a recording or reproducing operation using the most efficient process. For example, for the case where the power is turned on and the P-TOC is read out, if the current position of the optical head 3 can be confirmed, the optical head 3 can reach the P-TOC efficiently using, an access of a prescribed distance. In this way, an operation where the optical head is at the innermost wall of the recording/reproducing region to give position accuracy, the P-TOC area of the optical disc 1 is accessed and the reading of the P-TOC data is then started, is no longer necessary.

Second Embodiment

Figure 8B:
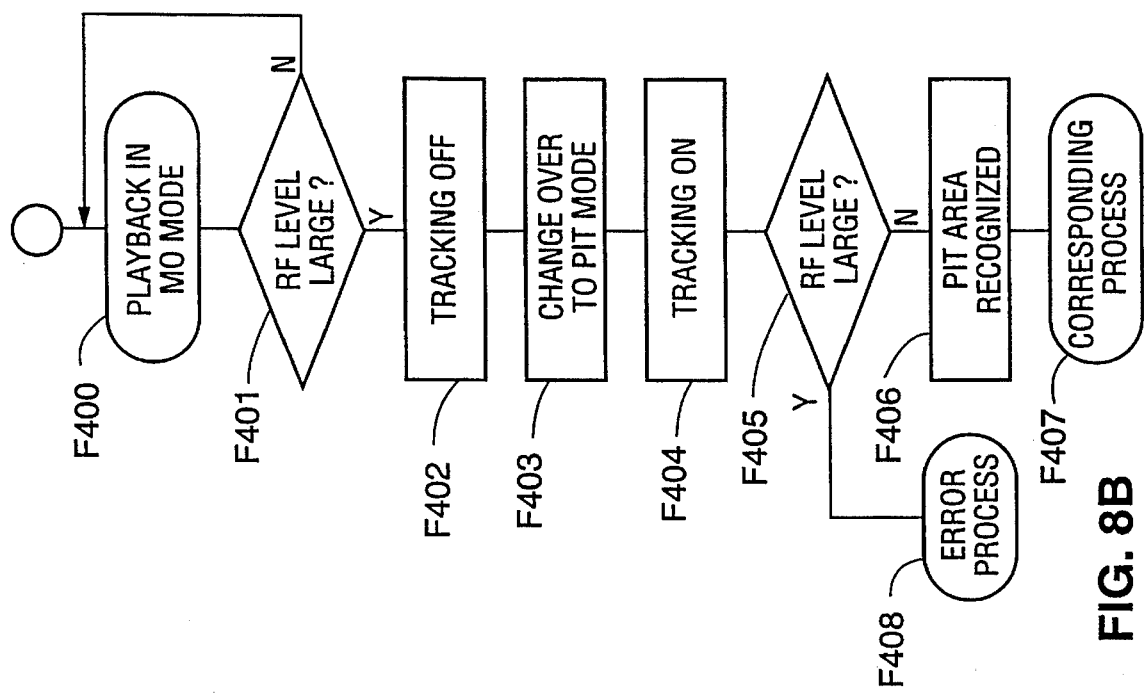
FIGS. 8(a) and 8(b) are flowcharts of the tracking operation mode changeover process for a second embodiment, where
Figure 8A:
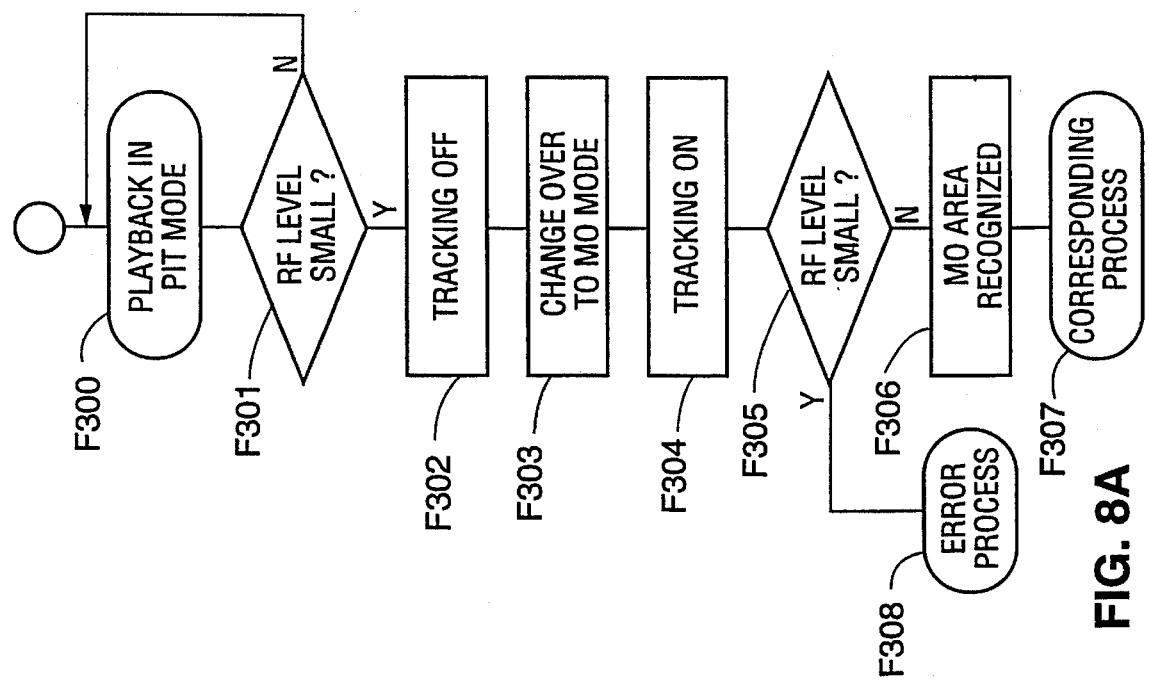

Next, a second embodiment of this invention will be described using FIGS. 8(a) and 8(b). The structure of the recording and/or reproducing apparatus is the same as that in FIGS. 3 to 6(b) and its description will therefore be omitted. Only the process for the system controller 7 is different and is shown in FIGS. 8(a) and 8(b).

In this second embodiment, whether or not the optical head 3 has shifted between the regions is determined via the RF signal level.

This is to say that the RF signal obtained while the optical head 3 scans at the pit region in the pit mode is within a certain appropriate level. If, at this time the optical head 3 is shifted into the recorded area while in the pit mode, the level of the RF signal will become relatively low.

On the other hand, the RF signal obtained while the optical head 3 scans at the recordable region in the MO mode is also within a certain appropriate level. If, at this time, the optical head 3 moves into the pit region while in MO mode, the RF signal level jumps to almost infinity.

This is because the gain is such that the RF signal obtained from the sum signal (I+J) is in the order of ten times or more greater than the RF signal obtained from the difference signal (I−J).

As a result of this kind of RF signal level difference, the process for level detection shown in FIGS. 8(a) and 8(b) can be executed. Namely, while the optical head 3 is reading out from the pit region in the pit mode (F300, F301), if the RF signal level becomes lower than a prescribed level, it can be determined that the optical head 3 has been moved into the recordable region. The tracking servo is turned off at this time, after which, the tracking operation mode is switched over to the MO mode. The tracking servo is then turned on and the RF level is determined (F302, F303, F304, F305). Then, in step F305, if the RF level is within an appropriate scope, it is determined that the optical head 3 has been moved into the recordable region (F306). The tracking servo and the reproduction of data are executed in the MO mode and the corresponding process is carried out (F307). In step F305, if the RF level is lower than an appropriate level, a process is carried out (F308) for errors due to other causes.

Also, while the optical head 3 is reading out the data from the recordable region in the MO mode (F400, F401), if the RF signal level becomes higher than a prescribed level, it can be determined that the optical head 3 has shifted into the pit region, the tracking servo is turned off at this time and the tracking operation mode is switched over to the pit mode. The tracking servo is then turned on and the RF level is determined (F402, F403, F404, F405). Then, in step F405, if the RF level is within an appropriate scope, it is determined that the optical head 3 has shifted into the pit region (F406). The tracking servo and the reproduction of data are executed in the pit mode and the corresponding process is carried out (F407). In step F405, if the RF level is lower than an appropriate level, a process is carried out (F408) for errors due to other causes.

The results-obtained in this second embodiment are the same as those obtained for the first embodiment. This method could of course also be used, for example, for determining the region at the time of start up etc.

Third Embodiment

Next, a recording and/or reproducing apparatus for a disc-shaped recording medium will be described for a third embodiment of the present invention using the diagrams. Portions which are the same as items in FIG. 3 are given the same numerals and their detailed description will be omitted.

Figure 9:
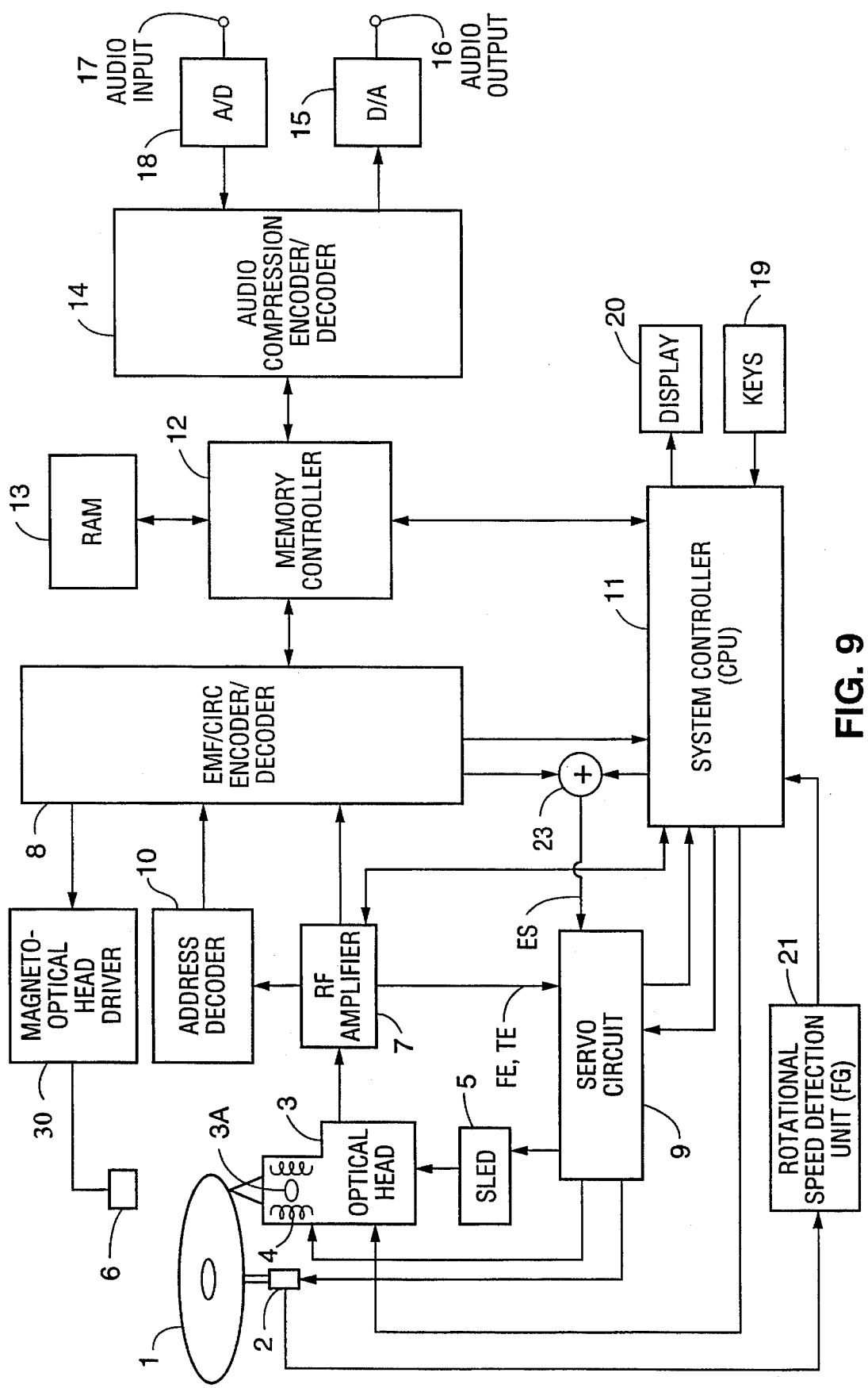
FIG. 9 is a block view of a recording and/or reproducing apparatus for a disc-shaped recording medium in a third embodiment of the present invention.

As shown in FIG. 9, the construction of the recording and/or reproducing apparatus for a disc-shaped recording medium for the third embodiment is similar to that for the first embodiment. The points which are different will be central to the following explanation.

A reference 21 indicates a rotational detecting unit which is constructed from a frequency generator FG (Frequency Generator) which generates a signal frequency corresponding to the number of rotations of the spindle motor by utilizing, for example, a reverse current obtained from the spindle motor driver. The outputted FG pulse is then sent to the system controller 11.

As with the aforementioned embodiments, the magneto-optical disc 1 has recorded data as the TOC information, which is management data for managing an area with recorded data, such as music, and an area which is capable of data recordation.

So, at a time just before the disc 1 is loaded int the recording and/or reproducing apparatus, or just before a recording or reproducing operation is performed, the system controller 11 drives the spindle motor 2 and the optical head 3. The data in the TOC region at the innermost side of the optical disc 1 is read out by the optical head 3. The TOC information which was read out is then supplied to the memory controller 12 via the RF amplifier 7 and the encoder/decoder 8. It is then stored in a prescribed region of the buffer memory 13 and used to control recording and/or reproducing operations of the disc 1.

Figure 10:
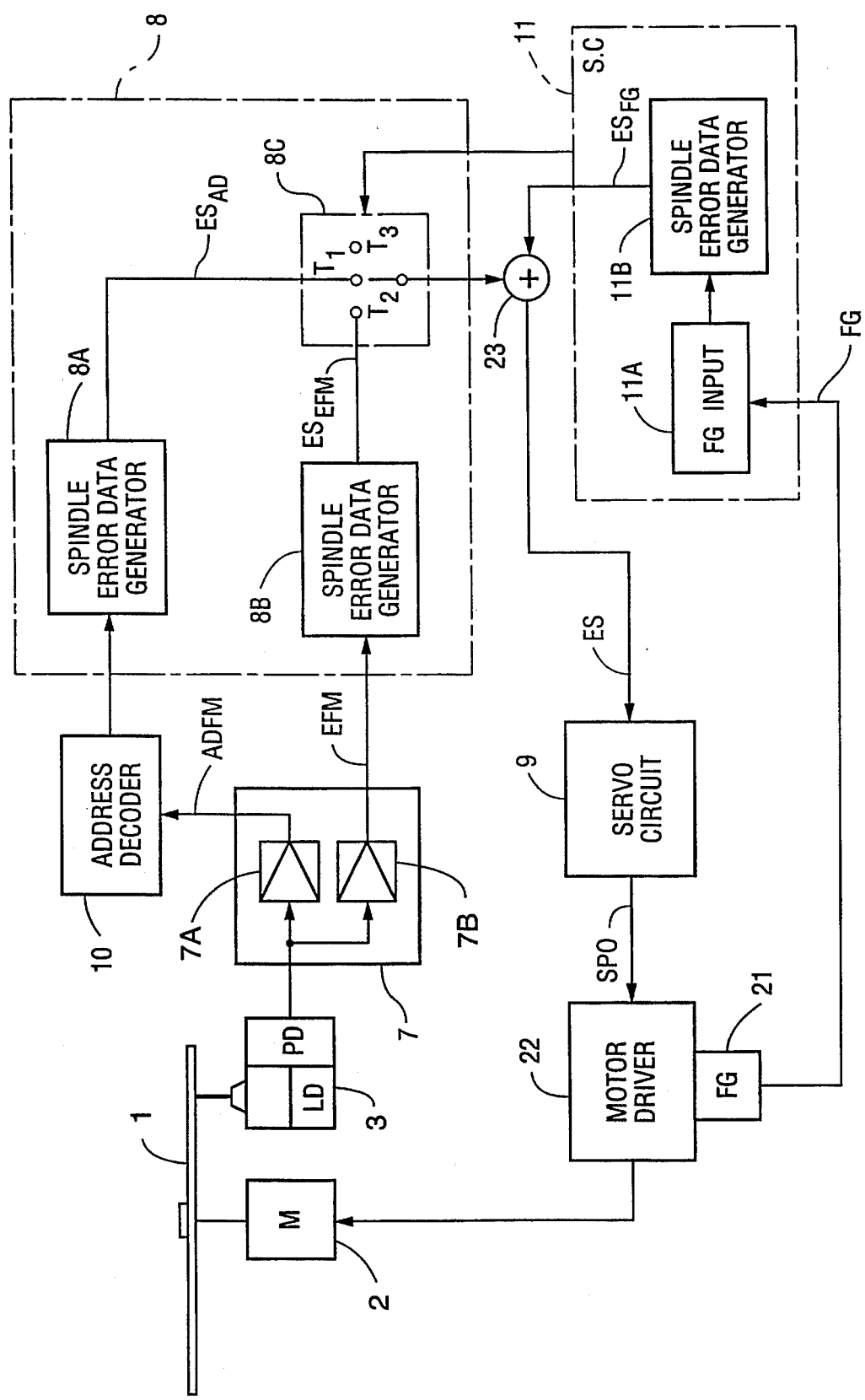
FIG. 10 is a block diagram of the essential parts of the structure of a spindle servo apparatus for the recording and/or reproducing apparatus for a disc-shaped recording medium in the present embodiment of this invention.

FIG. 10 only shows the construction of the spindle servo apparatus of the recording and/or reproducing apparatus in FIG. 9 for this third embodiment. The optical head 3 radiates the light beam emitted from the laser diode LD to the disc and has a photodetector PD for receiving the reflected light beam reflected from the disc 1. The photodetector PD includes a four-partition detector divided into four part (A, B, C, D), side spot detector (E, F) and an RF detector 43 (I, J).

At the RF amplifier 7, the RF signal to be to be recorded as an information signal as pit shapes in the pit region is generated by the calculation (I+J) and the RF signal to be recorded as an information signal in the recordable region is generated by the calculation (I−J). Also, the tracking error signal is generated at the RF amplifier 7 from the calculation (E−F) and the focus error signal FE is then generated by carrying out the calculation { (A+D)−(B+C)}.

Groove information is extracted from the push-pull signal generated by the calculation { (A+B)−(C+D)}.

An arithmetic amplifier 7a within the RF amplifier 7 in FIG. 10 obtains the groove information by the calculation { (A+B)−(C+D)} and supplies it to the address decoder 10.

Also, an arithmetic amplifier 7b generates an RF signal i.e. an EFM signal to be recorded as an information signal as pit shapes in the pit region by the calculation (I+J) and then supplies this to the encoder/decoder 8.

The spindle servo then uses these output signals from the arithmetic amplifiers 7a and 7b.

This is to say that while the optical head 3 is scanning the recordable region of the magneto-optical disc 1 during reproduction, in addition to carrying out the address demodulation operation from the groove information, the address decoder 10 also extracts bi-phase data using PLL demodulation after the groove information has been converted into binary data. By then a clock of a prescribed frequency is generated from this bi-phase data using PLL processing, this bit clock can be taken as the rotational speed information of the spindle motor.

The signal for use with the spindle servo extracted by the address decoder 10 is supplied to a spindle error data generator 8a in the encoder/decoder 8. The spindle error data generator 8a generates a spindle error signal $ES_{AD}$ and a servo signal which is necessary to control the number of rotations of the spindle motor 2.

Also, while the optical head 3 is scanning the pit region of the magneto-optical disc 1 or the readonly type optical disc 1 during reproduction, the EFM signal as the RF signal outputted from the arithmetic amplifier 7b in the RF amplifier 7 is supplied to the spindle error data generator 8b in the encoder/decoder 8. At the spindle error data generator 8b, a synchronization signal is extracted from the EFM signal which is supplied to the PLL circuit and a reproducing bit clock is obtained. A spindle error signal $ES_{EFM}$, a servo control signal necessary for the servo circuit 9 to control the number of rotations of the spindle motor 2, is generated to compare this reproducing bit clock with a reference system clock.

The spindle error signal $ES_{AD}$ is supplied to the terminal $T_1$ of an output changeover unit 8c and the spindle error signal $ES_{EFM}$ is supplied to the terminal $T_2$. The output signal the output changeover unit 8c is supplied to the servo circuit 9 via the adder 23. The control for the output changeover unit 8c is usually carried out using the system controller 11, so that the terminal $T_1$ is selected during reproducing of information recorded in the recordable region and the terminal $T_2$ is selected during reproducing of information from the pit region. However, the system controller 11 can also control the changeover in accordance with a control process program in the way described in the following.

The servo circuit 9 determines according to the inputted spindle error signals $ES_{AD}$ and $E_{EFM}$ as to whether the current rotational speed of the spindle motor 31 is higher or lower than the regulated speed. As a result, the servo circuit 9 generates a motor control signal SPO and this is supplied to the motor driver 22 so that the rotational speed of the spindle motor 31 becomes that of the regulation speed.

The rotational speed of the spindle motor 2 is then maintained at the regulation speed by applying a positive or negative current to it from the motor driver 22, so as to provide acceleration or deceleration with respect to a forward direction of rotation. Namely, if the spindle motor 2 is rotating too slowly, a positive current supplied to the spindle motor 2 to provide forward rotation according to the motor control signal SPO, so as to accelerate the spindle motor 2, and if the spindle motor is rotating too quickly, a negative current is supplied for rotation in the reverse direction according to the motor control signal SPO, so as to decelerate the spindle motor 2.

The FG pulse outputted from the rotation detecting unit 21 is supplied to the FG input unit 11a of the system controller 11 and the rotational speed of the spindle motor 2 is detected from the frequency of the FG pulse. The detection signal from the rotation detecting unit 21 is supplied to the spindle error data generator 8c. A spindle error signal $ES_{FG}$ is generated at the spindle data error generator 8c in accordance with the information concerning the rotational speed of the spindle motor 2, so that the spindle motor 2 becomes at least within a range which the servo is capable of pulling in from i.e. within the rough servo conditions.

This spindle error signal $ES_{FG}$ is supplied to the servo circuit 9 via the adder 23 for rough servo control of the spindle motor 2. At this time, the output changeover unit 8c is switched over to a terminal $T_3$.

With the spindle servo apparatus for this embodiment, spindle 5 error signals $ES_{AD}$ and $ES_{EFM}$ are changed over between the time of reproduction of information recorded in the recordable region and the time of reproduction of information recorded in the pit region. Also, in prescribed cases, changeovers are made using the spindle error signal $ES_{FG}$. In the following, the process for the system controller 11 is described with the flowcharts in FIGS. 11 to 13 and the servo operation using the spindle error signal $ES_{FG}$ is described using the flowchart in FIG. 14 for cases where spindle servo changeover takes place using the spindle error signal $ES_{FG}$.

Usually the spindle servo operation is carried out using the spindle error signals $ES_{AD}$ and $ES_{EFM}$ in the way described previously. Also, in this third embodiment, the servo is changed over based on an FG pulse for the case where the scanning carried out by the optical head 3 shifts between recording regions for whatever reason.

First, suppose that the optical head 3 shifts into the recordable region as a result of, for example, interference etc. while scanning the pit region of the magneto-optical disc 1.

Figure 11:
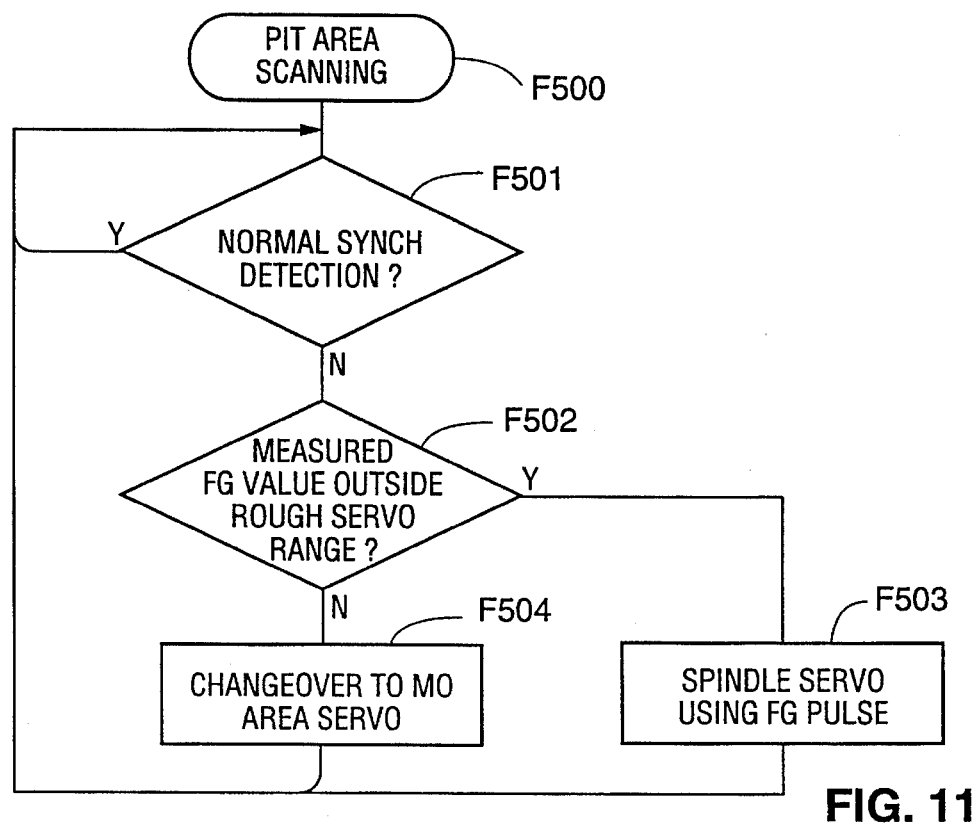
FIG. 11 is a flowchart of the spindle servo changeover operation for the case in the third embodiment when a movement of the head occurs from the pit region to the recordable region.

In the case of the process for the system controller 11 shown in FIG. 11, while the pit region of the magneto-optical disc 1 is being scanned by the optical head 3 (F500), observations are carried out to see if the synchronization signal extracted from the EFM signal is appropriate (F501). If the synchronization signal is out by more than a certain period and cannot be detected properly, it is determined that the optical head 3 has shifted into the recordable region (F501-NO).

The system controller 11 detects the number of rotations of the spindle motor 2 by bringing in the FG pulse from the rotation detecting unit 21, and determines whether or not the rotational condition of the spindle motor 2 is within the rough servo range (F502).

If it is within the rough servo range, and the servo mode is changed to the recordable region MO mode. In other words, the spindle servo is executed using the spindle error signal $ES_{AD}$ to change the output changeover unit 8c over to the terminal $T_1$ (F104). As a result, the spindle servo can be operated in the appropriate manner within the recordable region which the optical head 3 has been shifted to. As the equipment is now operating under normal conditions, the required processes, such as the optical head 3 returning to the pit region, can be carried out.

In step F502, if the spindle motor rotation conditions are outside the rough servo range, it is determined that the spindle motor 2 is in the middle of run-away or is in danger of running away.

The output changeover unit 8c is changed over to terminal $T_3$ and the spindle error signal $ES_{FG}$ is outputted from the spindle data generator 11b (F503).

By operating the spindle servo using the FG pulse in this way, as is described below, stabilization can take place to bring the rotation of the spindle motor back to rough servo conditions even during a run away. The servo operation can then continue by using the spindle error signal $ES_{FG}$ to affect a changeover (F504) with the servo using the spindle error signal $ES_{AD}$ corresponding to the recordable region when the rotation of the spindle motor 2 enters the rough servo range.

Next, suppose that the optical head 3 has been shifted into the pit region as a result of, for example, interference etc. while the optical head 3 is scanning the recordable region of the magneto-optical disc 1.

Figure 12:
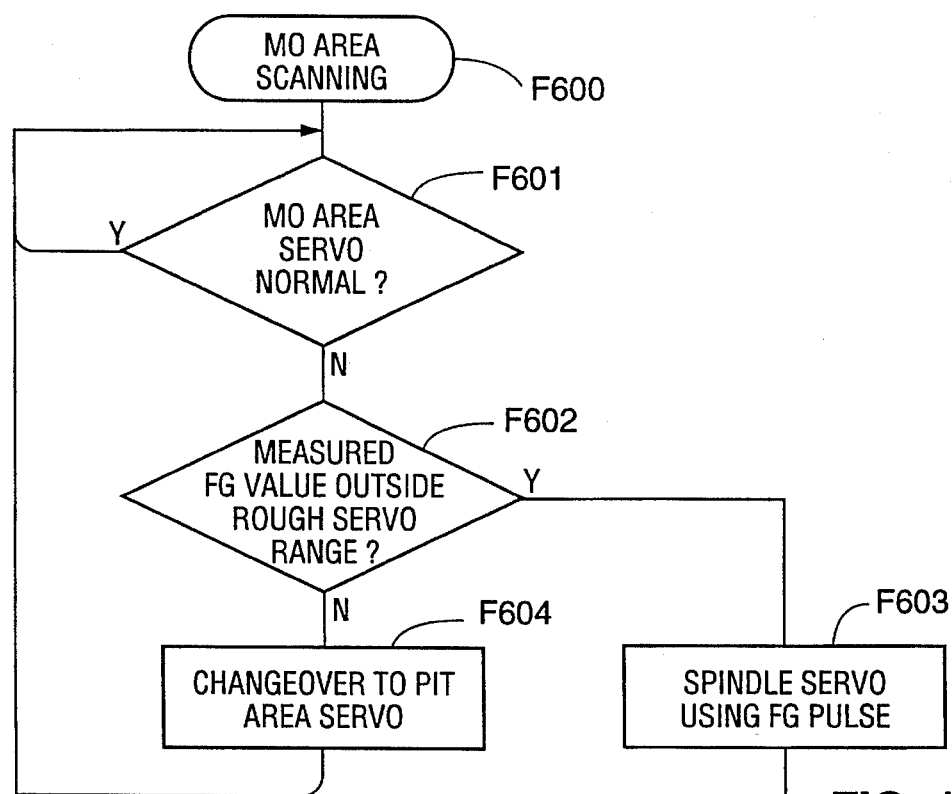
FIG. 12 is a flowchart of the spindle servo changeover operation for the case in the third embodiment when a movement of the head occurs from the recordable region to the pit region.

The case of the process for the system controller 11 is shown in FIG. 12. Here, while the system controller 11 is scanning the magneto-optical disc 1 for recordable regions with the optical head (F600), observations are carried out to see if normal spindle control is being carried out using, for example, the servo monitor signal (F601). If normal spindle control is not possible, it is determined that the optical head 3 has shifted into the pit region (F601→NO).

The system controller 11 then detects the number of rotations of the spindle motor 2 by bringing in the FG pulse from the rotational detecting unit 21, and determines whether or not the rotational condition of the spindle motor 2 is within the rough servo range (F602).

If it is within the rough servo range, the servo mode is changed to the pit region move. In other words, the spindle servo using the spindle error signal $ES_{EFM}$ changes the output changeover unit 8c over to the terminal $T_2$ (F604). As a result, the spindle servo is operated in the appropriate manner within the pit region which the optical head 3 has been shifted to. As the spindle motor 2 is now rotating under normal conditions, required processes can be carried out. For example, it is possible to return the optical head 3 to the recordable region.

In step F602, if the spindle motor rotation conditions are outside the rough servo range, as it is determined that the spindle motor 2 is in the middle of run-away or is in danger of running away, the output changeover unit 8c is changed over to terminal $T_1$ and the spindle error signal $ES_{FG}$ is outputted from the spindle error data generator 11b (F603). By operating the spindle servo using the FG pulse in this way, the rotation of the spindle motor 2 can be stabilized back to rough servo conditions even during a run away.

Changeover can then be performed (F604) with the servo using the spindle error signal $ES_{EFM}$ corresponding to the pit region when the rough servo range is entered.

The system controller 11 executes the spindle servo to use the FG pulse when the system controller 11 is performing track jumps of comparatively long distances.

Figure 13:
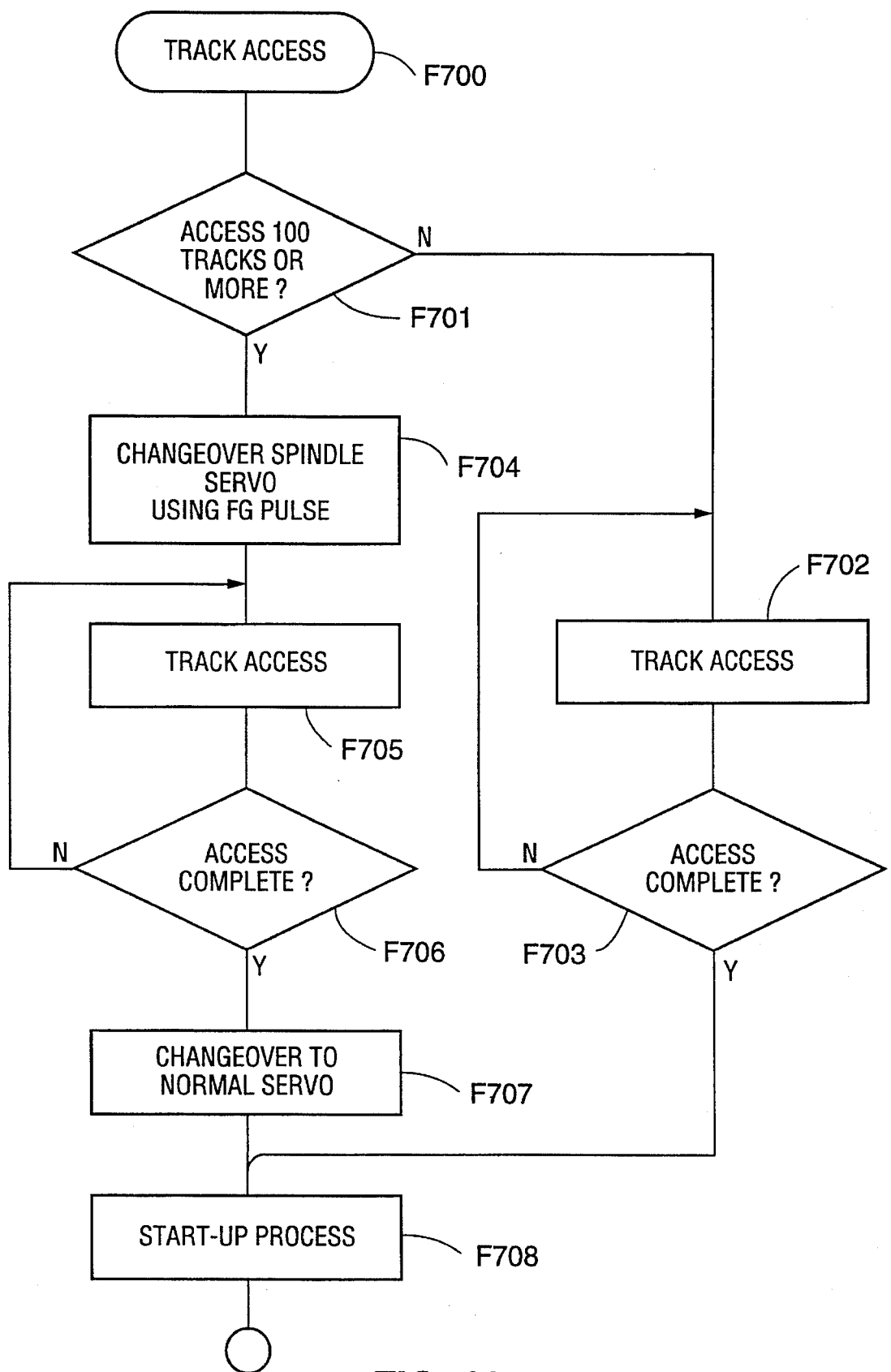
FIG. 13 is a flowchart of the spindle servo changeover operation for the case in the third embodiment where a track jump has occurred.

As shown in FIG. 13, while carrying out a track jump (F700), it is determined whether or not the number of tracks to be jumped is equal to or greater than 100 (F701). If it is less than 100, the track jump is carried out without any modifications being made. After the track jump is complete, each of the various servo start up operations are executed and the process for the next operation, for example, a reproducing operation, is gone to (F702, F703, F708). During this time, the changeover servo mode of the spindle servo is not in any way special.

When the track jump is of a comparatively long distance, in order to free the spindle servo using the spindle error signals $ES_{AD}$ and $ES_{EFM}$, it is not only difficult to maintain the rotation of the spindle motor 2 within the rough servo scope, but also, depending on the circumstances, the spindle motor 2 may rotate at a high speed or come to a halt. For example, while track jumping within the recordable region, the pregroove would have to be crossed, or the spindle error signal $ES_{AD}$ obtained at this time from the light beam reflected by the disc 1 may be of a frequency which is comparatively low (for example, about 5 kHz) when compared with the CLV control frequency (for example, 22.05 kHz). In this case, if the servo circuit 9 applies acceleration control to the spindle motor 2 so as to adjust the frequency of the error signal for the spindle error signal $ES_{AD}$ to the CLV control frequency, depending on the circumstances, the rotational speed of the spindle motor 2 may become extremely high.

In order to avoid this kind of occurrence, when it is determined in step F301 that the track jump is 100 tracks or over, the output changeover unit 8c is changed over to terminal $T_1$. Also, the spindle error signal $ES_{FG}$ is outputted from the spindle error data generator 11b (F704). In this way, the rough servo can be operated during track jumps (F705, F706) and a usual servo, method, i.e. a servo using the spindle error signal $ES_{AD}$ or the spindle error signal $ES_{EFM}$, can then be returned to (F707) upon completion of the track jump.

During these kinds of long distance accesses such as track jumps, by operating the spindle servo by using the FG pulse, the rough servo conditions can be easily stabilized during accesses and halting or run away of the spindle motor 2 can be avoided. Also, as the rough servo conditions for the servo can always be obtained, the start up process for the spindle servo can be swiftly executed after the track jumps.

It is also possible to change over the spindle servo based on the FG pulse in situations other than those described in FIGS. 11 to 13. For example, if a spindle servo is also operated using a spindle error signal $ES_{FG}$ at the time of the focus search operation to bring up the objective lens into the focus servo range, it is easy to fix the relative speeds of the optical head and the disc surface and the reliability of the focus search operation can be improved.

Spindle servos using the spindle error signal $ES_{FG}$ generated according to the FG pulse are executed in the above way. However, this spindle error signal $ES_{FG}$ is generated and outputted in the way shown in FIG. 14.

First, the frequency of the FG pulse is calculated so that the number of spindle motor rotations can be understood (F800). it is then determined whether or not this IO frequency of the FG pulse falls within the rough servo scope (F801). If it falls outside the rough frequency range, it is then determined if the rotational speed is higher (F802→N) or lower (F802→Y) than that for the rough servo conditions.

If the spindle motor 2 is rotating too quickly, the spindle error signal $ES_{FG}$ is outputted as a decelerating kick pulse (F806). A current is supplied to the spindle motor 2 in a decelerating direction by the servo circuit 9 and the motor driver 22, so that the rotational speed of the spindle motor is reduced.

On the other hand, if the spindle motor 2 is rotating too slowly, the spindle error signal $ES_{FG}$ is outputted as an accelerating kick pulse (F803). A current is supplied to the spindle motor 2 in an accelerating direction by the servo circuit 9 and the motor driver 22, so that the rotational speed of the spindle motor 2 is increased.

The rough servo can therefore be reined in by using the loop F800→F801→F802→F806→F807→F800, or the loop F800→F801→F802→F803→F804→F800.

The possibility of the spindle motor 2 running away in the reverse direction so as to give reverse rotation, which depends on the circumstances, also has to be taken into consideration. However, the rotational direction of the spindle motor 2 cannot be determined just by calculating the frequency of the FG pulse frequency, so the process in steps F804 and F807 is carried out.

Figure 15:
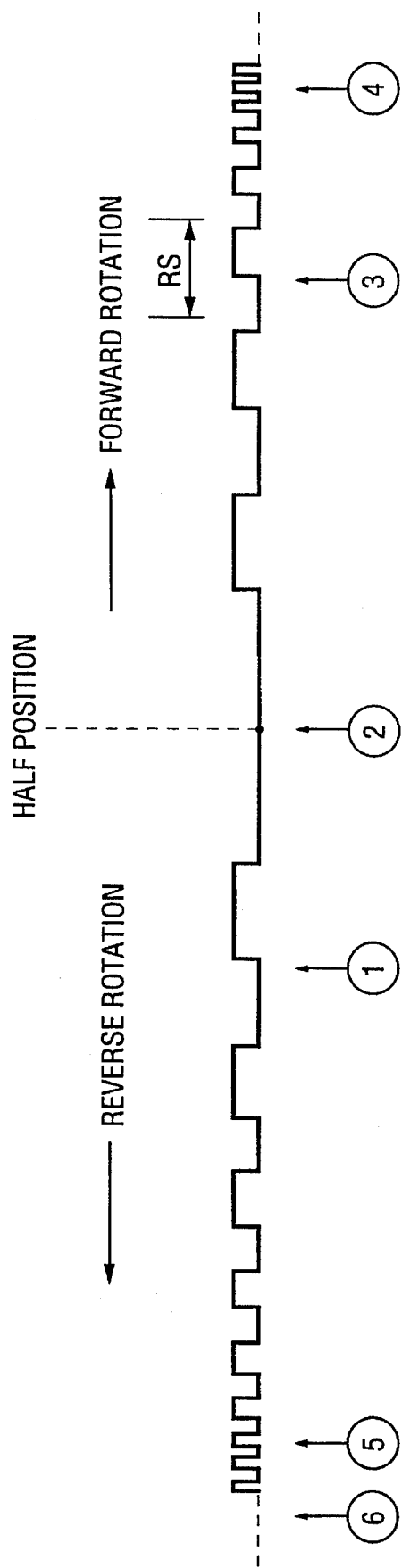
FIG. 15 is a view describing the rotational direction detecting operation for the case in the third embodiment where the spindle servo is carried out based on the FG pulse.

FIG. 15 shows an FG. pulse corresponding to the rotational speed of a spindle motor. Let it be supposed that the portion is the rough servo range.

For example, when the rotational speed of the spindle motor 2 is the speed 4, steps F802 to F406 are gone through and a decelerating kick pulse is outputted. As control is therefore exerted to bring the speed 3 within the rough speed scope, there are no problems. Assuming the case where the speed 5 is the same as the speed 4, but is instead for reverse rotation, as the direction of rotation of the spindle motor 2 cannot be detected from the frequency, the process will also go through the steps F802 to F806 at this time and a deceleration kick pulse will be outputted. The directional control applied to the speed 6 will only serve to facilitate the reverse run away of the spindle motor 2.

Assuming the speed 1 as the frequency of the FG pulse is lower than that for the rough servo scope RS, step F803 is gone through, an accelerating kick pulse is outputted, and control is carried out in the direction of positive rotation of the spindle motor 2. However, it takes a great deal of time for the spindle motor 2 to return to the halted position 2 and then accelerate up to the speed 3 so as to be within the boundary of the rough servo range.

In order to counteract this, it is confirmed if the frequency of the FG pulse was put up in step F804 or if the frequency of the FG pulse was counted in step F807.

If rotation of the spindle motor 2 is in the positive direction and if it is necessary to output an accelerating kick pulse, the frequency of the FG pulse will increase. If it is necessary to output a decelerating kick pulse, the FG pulse frequency will fall. It follows that if the frequency of the FG pulse falls after outputting an accelerating kick pulse, or if the frequency of the FG pulse increases after outputting a decelerating kick pulse, it can be determined that the spindle motor 2 is rotating in the reverse direction. Therefore, in this case, step F805 or step F808 is gone to and an accelerating kick pulse of a sufficient duration to return the spindle motor 2 to the forward rotation is outputted, so that normal rotation of the spindle motor 2 is returned to in a forceful manner.

Figure 14:
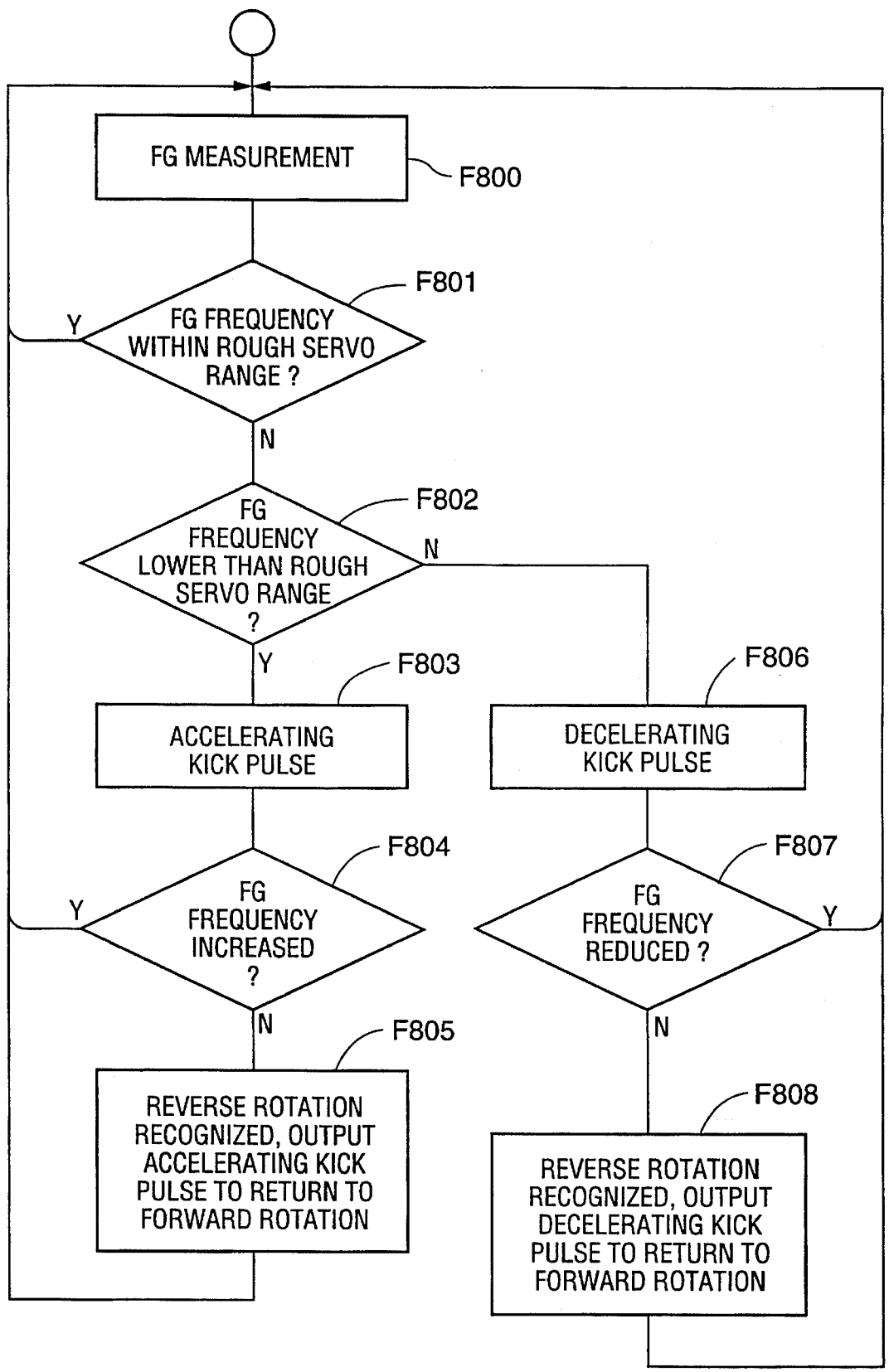
FIG. 14 is a flowchart for the case in the third embodiment where the spindle servo is executing the FG pulse.

The accelerating kick pulse output in step F805 and step F808 must be of a sufficient duration and continue for long enough to ensure that forward rotation can be returned to whatever speed the spindle motor 2 is rotating. As a result of this, the rotational speed may be too fast, depending on the circumstances, when the spindle motor returns to forward rotation. However, if the spindle servo loop shown in FIG. 14 is used for forward operation to exert control to stay within the rough servo range then there will be no problem.

By generating a spindle error signal $ES_{FG}$ in the above way, when it is not possible to read out the appropriate data for the spindle servo using the optical head 3, i.e. when the optical head 3 has been accidentally shifted into the pit region or the recordable region, during access, or during the focus search operation, the spindle servo can be easily controlled. By, executing the spindle servo using the spindle error signal $ES_{FG}$ in the way described above for this third embodiment in FIGS. 11 to 13, it is possible to prevent spindle motor 2 run away and it also becomes possible to return to normal operation from the spindle motor run away condition. Also, by stabilizing the operation of the spindle motor 2, it is possible to rapidly execute the start up process after an access.

The third embodiment is described above, but the spindle servo apparatus for the present invention is by no means limited to the to aforementioned embodiments and various variations are possible.

For example, an item other than the frequency generator FG may be used as the rotational speed detection apparatus. It is also possible to make the rotational speed detection apparatus in such a way that it is capable of determining the rotational direction. For example, the rotational direction may be detected by looking at the phase difference between two FG pulses.

Also, even in cases other than the case in FIGS. 11 to 13 or the case for a focus search, the spindle servo can be changed over to in a forceful manner based on the rotational speed detection apparatus (FG) when the spindle servo becomes in-operable.

What is claimed is:

1. A recording and/or reproducing apparatus for a disc-shaped recording medium, said disc shaped recording medium having first and second recording regions, with information signals being recorded using pits in the first recording region, and information signals being recorded using a magneto-optical method employing a pregroove in the second region, comprising:

head means for recording/reproducing information signals to/from the disc-shaped recording medium and moving between the first and second recording regions of the disc-shaped recording medium;

a spindle motor for rotationally driving the disc-shaped recording medium;

first spindle control signal generating means for generating a first spindle control signal according to data read out from the second recording region of the disc-shaped recording medium by said head means;

second spindle control signal generating means for generating a second spindle control signal according to data read out from the first recording region of the disc-shaped recording medium by said head means;

rotational detecting means for detecting the number of rotations of said spindle motor;

third spindle control signal generating means for generating a third spindle motor control signal based on a signal from said rotational detecting means; and control means for determining as to whether said head means is positioned in the first region or the second region of the disc-shaped recording medium according to the output signal from said head means, said control means for selecting said first, second and third spindle control signals outputted from said first, second and third spindle control signal generating means according to the determination result and controlling said spindle motor using the selected spindle control signal.

2. A recording and/or reproducing apparatus for a disc-shaped recording medium according to claim 1, wherein said control means selects said third spindle control signal from said third spindle control signal generating means and executes spindle control while said head means is performing access operations greater than or equal to a prescribed distance with respect to the disc-shaped recording medium.

3. A recording and/or reproducing apparatus for a disc-shaped recording medium according to claim 1, wherein said control means detects when said head means has moved from either one of the first or second recording regions of the disc-shaped recording medium into the other of the first or second recording regions according a synchronization signal extracted from the output signal from said head means, and selects said first, second and third spindle control signals according to the detection result and controls the rotation of said spindle motor by using the selected spindle control signal.

4. A recording and/or reproducing apparatus for a disc-shaped recording medium according to claim 3, wherein said control means selects said third spindle control signal from said third spindle control signal generating means and carries out spindle control when said head means has moved from either one of the first or second recording regions of the disc-shaped recording medium into the other of the first or second recording regions.

5. A recording and/or reproducing apparatus for a disc-shaped recording medium according to claim 1, wherein said second spindle control signal generating means generates said second spindle control signal by comparing a reproducing bit clock generated according to a synchronization signal extracted from the output signal from said head means and a reference system clock.

6. A recording and/or reproducing apparatus for a disc-shaped recording medium according to claim 1, wherein said first spindle control signal generating means extracts biphase data using a signal for detecting a pregroove formed on the disc-shaped recording medium generated as an output signal from said head means, and generates said first spindle control signal based on the extracted biphase data.

* * * * *